United States Patent [19]
Vinciarelli et al.

[11] Patent Number: 5,432,431
[45] Date of Patent: * Jul. 11, 1995

[54] BOOST SWITCHING POWER CONVERSION USING SATURABLE INDUCTORS

[75] Inventors: Patrizio Vinciarelli, Boston, Mass.; Charles S. Skoolicas, Derry, N.H.

[73] Assignee: VLT Corporation, San Antonio, Tex.

[*] Notice: The portion of the term of this patent subsequent to Jun. 14, 2011 has been disclaimed.

[21] Appl. No.: 887,486

[22] Filed: May 21, 1992

[51] Int. Cl.⁶ ............... G05F 1/56; H02M 3/335
[52] U.S. Cl. ................... 323/222; 323/285; 363/21
[58] Field of Search ........... 323/222, 282, 285, 286; 363/16, 20, 21, 97; H02M 3/335; G05F 1/56, 1/62

[56] References Cited

U.S. PATENT DOCUMENTS

| | | | |
|---|---|---|---|
| 4,553,199 | 11/1985 | Harada et al. | 363/75 |
| 4,648,020 | 3/1987 | Vinciarelli | 363/71 |
| 4,677,366 | 6/1987 | Wilkinson et al. | 323/222 |
| 4,720,667 | 1/1988 | Lee et al. | 323/271 |
| 4,829,232 | 5/1989 | Erickson, Jr. | 323/290 |
| 4,940,929 | 7/1990 | Williams | 323/222 |
| 5,262,930 | 11/1993 | Hua et al. | 363/21 |
| 5,321,348 | 6/1994 | Vinciarelli et al. | 323/222 |

FOREIGN PATENT DOCUMENTS 0351144 1/1990 European Pat. Off. .

OTHER PUBLICATIONS

Sebastian, Uceda, Perez, Rico and Aldana; "A Very Simple Method To Obtain One Additional Fully Regulated Output in Zero-Current-Switched Quasiresonant Converters"; PESC '90 Conference Proceedings, vol. 2, Jun. 11, 1990, pp. 536–542.

Buchanan & Miller; "Resonant Switching Power Conversion Technique"; PESC 75 Record, pp. 188–193.

Liu and Lee; "Resonant Switches—A Unified Approach To Improve Performances of Switching Converters"; IEEE International Telecommunications Energy Conference, 1984 Proceedings; pp. 344–351.

Primary Examiner—Steven L. Stephan
Assistant Examiner—Adolf Berhane
Attorney, Agent, or Firm—Fish & Richardson

[57] ABSTRACT

In a zero-current switching boost power converter which includes coupled inductors, and which operates in a half-cycle mode wherein the switch is turned off at the first zero-crossing of current subsequent to the switch being turned on, a negative voltage which would otherwise appear across the switch is instead supported by a saturable inductor. The component values in the zero-current switching boost converter are arranged so as to maintain the peak negative voltages which appear across the converter capacitor and the saturable inductor at relatively low levels and the volt-second capability of the saturable inductor is chosen so that the effect of the inductor on circuit losses and overall circuit operation is minimized. Implementations of switches for use in such a converter, which include a diode in parallel with a unidirectional switch, are also disclosed.

23 Claims, 29 Drawing Sheets

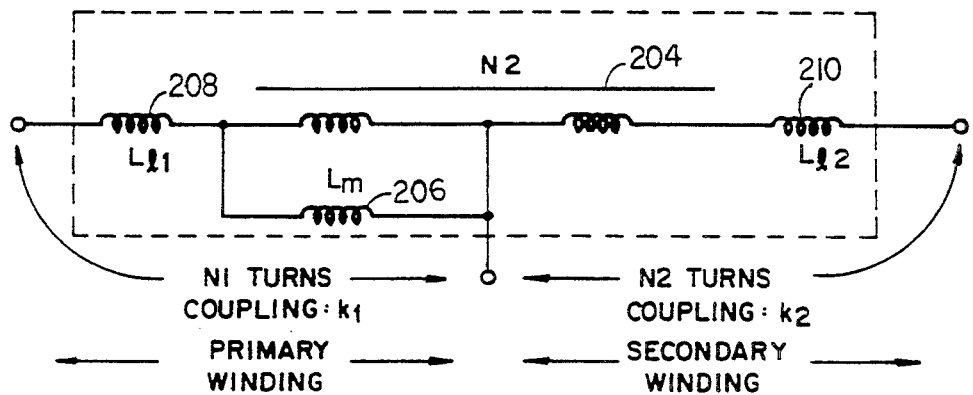

GENERAL ($k_1 \neq k_2$)

$$k = \sqrt{k_1 \times k_2} \qquad \frac{L_{pri}}{L_{sec}} = \left(\frac{k_2}{k_1}\right) a^2$$

$$L_m = ak\sqrt{L_{pri} \times L_{sec}}$$

$$L_{\ell 1} = L_{pri} - L_m = \left(\frac{1-k_1}{k_1}\right) L_m = (1-k_1) L_{pri}$$

$$L_{\ell 2} = L_{sec} - \frac{L_m}{a^2} = \left(\frac{1-k_2}{k_2}\right)\left(\frac{L_m}{a^2}\right)$$

EQUALLY COUPLED ($k_1 = k_2 = k$)

$$\frac{L_{pri}}{L_{sec}} = a^2$$

$$L_{\ell 1} = (1-k) L_{pri}$$

$$L_{\ell 2} = (1-k) L_{sec} = \left(\frac{1-k}{a^2}\right) L_{pri}$$

$$L_m = k(L_{pri})$$

$$\frac{L_{\ell 1}}{L_{\ell 2}} = a^2$$

FIG. 4

PEAK NEGATIVE VOLTAGE ACROSS CAPACITOR

| CONVERTER CONFIGURATION | FORWARD DIODE | TURNS RATIO | CONVERTER INPUT VOLTAGE AND INITIAL INPUT CURRENT ||||||||||
|---|---|---|---|---|---|---|---|---|---|---|---|---|
| | | | 0V | 50V |||| 150V ||||
| | | | 0A | 0A | 0.1A | 1A | 3A | 0A | 0.1A | 0.3A | 3A | 9A |
| FIGURE 9 | N.A. | N.A | 325 | 320 | 321 | 324 | 333 | 309 | 309 | 310 | 315 | 313 |
| FIGURE 10 | NO | 1.5 | 115 | 92.6 | 92.9 | 93 | 98 | 46.6 | 47 | 46.9 | 53.4 | 103 |
| FIGURE 10 | NO | 2 | 149 | 130 | 130 | 131 | 137 | 88.9 | 89.2 | 89.2 | 97.8 | 163 |
| FIGURE 10 | NO | 3 | 197 | 181 | 181 | 182 | 190 | 146 | 146 | 146 | 158 | 246 |
| FIGURE 11 | YES | 1.5 | 59.2 | 50.6 | 51.9 | 52.4 | 69.1 | 42.1 | 43.4 | 43.8 | 53.8 | 105 |
| FIGURE 11 | YES | 2 | 99.9 | 92.5 | 93.8 | 94.6 | 116 | 82.5 | 83.7 | 84 | 100 | 160 |
| FIGURE 11 | YES | 3 | 157 | 148 | 149 | 150 | 170 | 134 | 135 | 135 | 152 | 246 |

COUPLED CONVERTERS:

L$l2$ = 10 μH
L$l1$ = 0.95 μH
Lm = 48 μH
C = .025 μF
IDEAL DIODE IN SERIES WITH SWITCH

DISCRETE CONVERTERS:

PEAK NEGATIVE VOLTAGE ACROSS BLOCKING DIODE

| CONVERTER CONFIGURATION | FORWARD DIODE | TURNS RATIO | CONVERTER INPUT VOLTAGE AND INITIAL INPUT CURRENT |||||||||
|---|---|---|---|---|---|---|---|---|---|---|---|
| | | | 0V | 50V |||| 150V ||||
| | | | 0A | 0A | 0.1A | 1A | 3A | 0A | 0.1A | 0.3A | 3A | 9A |
| FIGURE 9 | N.A. | N.A. | 330 | 323 | 324 | 327 | 330 | 307 | 307 | 308 | 299 | 213 |
| FIGURE 10 | NO | 1.5 | 101 | 84.3 | 84.9 | 84.7 | 89.2 | 28 | 29.5 | 28.5 | 37.4 | 90.5 |
| FIGURE 10 | NO | 2 | 161 | 145 | 147 | 147 | 154 | 108 | 108 | 109 | 119 | 193 |
| FIGURE 10 | NO | 3 | 221 | 208 | 208 | 209 | 219 | 175 | 174 | 175 | 188 | 289 |
| FIGURE 11 | YES | 1.5 | 59 | 80.7 | 82.2 | 78.2 | 81.2 | 140 | 141 | 141 | 124 | 118 |
| FIGURE 11 | YES | 2 | 119 | 131 | 132 | 130 | 145 | 166 | 167 | 167 | 166 | 188 |
| FIGURE 11 | YES | 3 | 183 | 184 | 185 | 184 | 200 | 193 | 194 | 194 | 193 | 289 |

COUPLED CONVERTERS:

Lℓ2= 10 μH
Lℓ1= 0.95 μH
Lm= 48 μH
C= .025 μF
IDEAL DIODE IN SERIES WITH SWITCH

DISCRETE CONVERTERS:

PEAK NEGATIVE VOLTAGE ACROSS CAPACITOR

| CONVERTER CONFIGURATION | FORWARD DIODE | TURNS RATIO | CONVERTER INPUT VOLTAGE AND INITIAL INPUT CURRENT | | | | | | | | | | | |
|---|---|---|---|---|---|---|---|---|---|---|---|---|---|---|
| | | | 0V | 50V | | | | 150V | | | | |
| | | | 0A | 0A | 0.1A | 1A | 3A | 0A | 0.1A | 0.3A | 3A | 9A |
| FIGURE 17 | NO | 1.5 | 115 | 92.6 | 92.7 | 93.1 | 97.3 | 46.7 | 46.8 | 46.8 | 52.9 | 101 |
| FIGURE 17 | NO | 2 | 149 | 130 | 130 | 130 | 136 | 88.6 | 88.9 | 88.8 | 96.7 | 160 |
| FIGURE 17 | NO | 3 | 197 | 180 | 181 | 181 | 188 | 145 | 145 | 145 | 156 | 242 |
| FIGURE 18 | YES | 1.5 | 55.5 | 46.7 | 48 | 52.3 | 64.6 | 38.2 | 39.7 | 40.4 | 54.1 | 99.2 |
| FIGURE 18 | YES | 2 | 96 | 88.6 | 89.9 | 95.6 | 108 | 78.8 | 80.2 | 80.7 | 95.3 | 157 |
| FIGURE 18 | YES | 3 | 153 | 144 | 146 | 146 | 165 | 130 | 132 | 132 | 153 | 242 |

$L\ell 2 = 10\ \mu H$
$L\ell 1 = .95\ \mu H$
$Lm = 48\ \mu H$
$C = .025\ \mu F$
SATURABLE INDUCTOR IN SERIES WITH SWITCH

FIG. 21

PEAK NEGATIVE VOLTAGE ACROSS SATURABLE INDUCTOR

| CONVERTER CONFIGURATION | FORWARD DIODE | TURNS RATIO | CONVERTER INPUT VOLTAGE AND INITIAL INPUT CURRENT | | | | | | | | | |
|---|---|---|---|---|---|---|---|---|---|---|---|---|
| | | | 0V | 50V | | | | 150V | | | | |
| | | | 0A | 0A | 0.1A | 1A | 3A | 0A | 0.1A | 0.3A | 3A | 9A |
| FIGURE 17 | NO | 1.5 | 47.9 | 36.1 | 36.1 | 36.4 | 38.3 | 19.6 | 18.5 | 18.8 | 19.9 | 36 |
| FIGURE 17 | NO | 2 | 101 | 85.4 | 85.7 | 85.8 | 91 | 50.1 | 50.6 | 50.6 | 56.8 | 114 |
| FIGURE 17 | NO | 3 | 170 | 153 | 153 | 154 | 162 | 113 | 113 | 113 | 124 | 220 |
| FIGURE 18 | YES | 1.5 | 20.5 | 31.8 | 32.7 | 36.3 | 31.6 | 82.1 | 83.3 | 83.1 | 71.9 | 43.5 |
| FIGURE 18 | YES | 2 | .64.3 | 74.3 | 75.4 | 83 | 80.8 | 109 | 110 | 110 | 100 | 110 |
| FIGURE 18 | YES | 3 | 131 | 130 | 131 | 130 | 141 | 136 | 137 | 138 | 143 | 220 |

$Ll2 = 10\ \mu H$
$Ll1 = .95\ \mu H$
$Lm = 48\ \mu H$
$C = .025\ \mu F$
SATURABLE INDUCTOR IN SERIES WITH SWITCH

FIG. 22

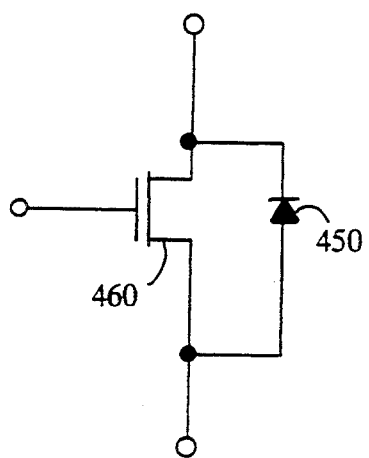
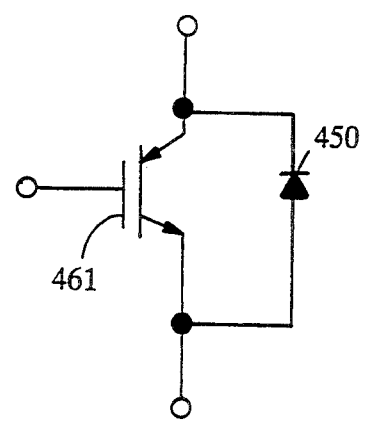
FIG. 23A             FIG. 23B

BOOST SWITCHING POWER CONVERSION USING SATURABLE INDUCTORS

This application is related to U.S. application Ser. No. 07/722,537, filed Jun. 27, 1991 now U.S. Pat. No. 5,321,348 Jun. 14, 1994.

This invention relates to boost switching power converters of the zero-current switching kind.

Boost power converters accept power from an input voltage source and deliver power to a load at a controllable load voltage value which is greater than the voltage delivered by the input source. Such converters are useful in applications where a load must be supplied with a voltage greater in magnitude than the available source voltage, or where the magnitude of the voltage delivered by an input source may, under either steady-state or transient conditions, drop below the minimum value of operating voltage required by the load. In one class of boost power converters, referred to herein as zero-current switching boost power converters, the main switching element, or elements, included in the power converter are turned on and off at zero current. By this means switching losses in the switching elements are essentially eliminated and the converter may be operated at relatively high operating frequencies (i.e. the frequency at which converter operating cycles are initiated by turning the switching element on). One benefit of increased operating frequency is that the size of magnetic and capacitive elements in the converter may be reduced with a corresponding reduction in the overall size of the converter. Embodiments of one type of zero-current switching boost power converters (of the type described in Buchanan and Miller, "Resonant Switching Power Conversion Technique," PESC 75 Record, p. 188; in Liu and Lee, "Resonant Switches—A Unified Approach to Improve Performances of Switching Converters," IEEE International Telecommunications Energy Conference, 1984 Proceedings; and in Lee et al, U.S. Pat. No. 4,720,667, "Zero-Current Switching Quasi-Resonant Converters Operating in a Full-Wave Mode," Jan. 19, 1988) are shown in FIGS. 1 and 2. Embodiments of another type of zero-current switching boost power converter (of the type described in Vinciarelli, U.S. patent application Ser. No. 07/722,537, filed Jun. 27, 1991) are shown in FIGS. 3A through 3E and FIGS. 7A through 7D. In the embodiments of FIGS. 1 and 2 the converters include two discrete inductors (i.e. two inductors between which there is essentially no magnetic coupling), whereas in all of the embodiments of FIGS. 3 and 7 the converters include at least one coupled inductor (i.e. a pair of magnetically coupled windings with each winding exhibiting a controlled amount of leakage inductance).

In one operating mode of the converters of FIGS. 1, 2, 3 and 7, referred to herein as the short-cycle mode, a converter operating cycle is initiated by turning the switching element on (at zero current) and then turning the switching element off at essentially the first subsequent instant in time at which the current in the switch returns to zero. Other operating modes, referred to herein as long-cycle operating modes, and described in the references cited above, provide for turning the switch off at a zero crossing other than the first (e.g. the second or fourth zero crossing). One of the benefits of the short-cycle operating mode (as explained in the referenced Vinciarelli application) is that the operating frequency of the converter becomes strongly dependent upon converter loading and, in accordance with Vinciarelli, U.S. Pat. No. 4,648,020, "Power Booster Switching at Zero Current," Mar. 3, 1987, two or more such converters will predictably share in the power delivered to a load if their operating frequencies are synchronized. In the short-cycle operating mode, the switching element must support both positive and negative voltages when it is off. As a practical matter, switching elements which can support both positive and negative voltages when open, and which exhibit switching speeds consistent with efficient converter operation at relatively high operating frequencies (e.g. 300 KHz or 500 KHz) are not currently available, and prior art converters which operate in the short-cycle mode have made use of switch configurations of the kind shown in FIG. 8. In FIG. 8A the composite switching element consists of a unidirectional switch (i.e. one capable of carrying current in the direction of the arrow when on, and able to support a positive voltage, Vsw, when off) in series with a unidirectional conducting device. The unidirectional conducting device is selected to: (a) support an appropriate value of negative voltage when the unidirectional switch is off, and (b) exhibit a reverse recovery time which is relatively fast relative to a converter operating cycle (to minimize momentary reverse current flow in the diode when the unidirectional switch is turned off). FIGS. 8B and 8C illustrate implementations wherein the unidirectional switch is a field effect transistor and an insulated gate bipolar transistor, respectively. In using such a composite switch, current flow in the unidirectional conducting device results in heat loss which reduces the overall operating efficiency (i.e. the ratio of power delivered by the converter to the load to the power delivered by the input source) of the converter. Thus, although the operating efficiency of a zero-current switching boost converter operating in the short-cycle mode might be expected to be higher than the efficiency of a converter operating in a long-cycle mode (because the time period during which the switching element carries current is minimized in the short-cycle mode), the potential for improved efficiency inherent to the short-cycle mode is counteracted by the losses attendant to the composite switch.

SUMMARY OF THE INVENTION

In embodiments of the invention, a zero-current switching boost power converter includes coupled inductors and operates in a half-cycle mode wherein the switch is turned off at the first zero-crossing of current subsequent to the switch being turned on, and a negative voltage which would otherwise appear across the switch is instead supported by a saturable inductor of relatively low resistance.

Thus in general, in one aspect, the invention features a boost power converter apparatus for transferring power from an input voltage source to a voltage-sinking load at a load voltage of magnitude greater than the magnitude of the voltage of the input voltage source. The apparatus includes a magnetic circuit having at least one coupled inductor, a saturable inductor, and a switch connected to form a series circuit comprising the switch, the input voltage source, the saturable inductor, and at least a first winding of the coupled inductor. A first capacitor is connected to form a series circuit comprising the first capacitor, the switch, the saturable inductor, and at least a second winding of the coupled inductor. The capacitor cooperates with the magnetic circuit and the saturable inductor to define a characteristic time constant for the time variation of the sinusoidal component of the switch current which flows after the switch is closed. A switch controller turns the switch on and off at times when the current in the switch is substantially zero, the turn on times being controlled to regulate the ratio of the voltage across the load to the average value of voltage across the input source, the ratio being greater than or equal to one. A first unidirectional conducting device is connected between the magnetic circuit and the load, the unidirectional conducting device being poled to permit current to flow in the direction of the load. The magnetic circuit includes an input port, an output port, and a shunt port, the input source being connected between the input port and one end of the switch, the saturable inductor being connected between the other end of the switch and the shunt port, the first capacitor being connected between the output port and the junction of the input source and the switch, and the first unidirectional conducting device being connected to the output port.

Embodiments of the invention include the following features. The magnetic circuit includes a coupled inductor having a first winding and a second winding. In some embodiments, the first winding is connected between the input port and the shunt port; and the second winding is connected between the shunt port and the output port. The polarity of the windings is arranged so that imposition of a positive voltage between the input port and the shunt port induces a positive voltage to appear between the output port and the shunt port. In other embodiments, the first winding is connected between the input port and the output port, the second winding is connected between the shunt port and the output port, and the polarity of the windings is arranged so that imposition of a positive voltage between the input port and the output port induces a positive voltage to appear between the output port and the shunt port.

The magnetic circuit may include a discrete inductor connected in series with the first or second winding. The magnetic circuit may include a second coupled inductor having a third winding and a fourth winding, the third winding connected to the input port and in series with the first winding and the fourth winding connected between the junction of the first and second windings and the output port. The magnetic circuit may include a discrete inductor connected in series with the third winding or the fourth winding.

The coupled inductor may be characterized by a turns ratio, $a=N1/N2$; a total first winding inductance, Lpri; a total second winding inductance, Lsec; first and second winding leakage inductances, L11 and L12, respectively; and a magnetizing inductance, Lm, where $Lpri=Lm+L11$ and $Lsec=L12+Lm/a^2$.

The switch is turned off at essentially the first instant in time, following the time when the switch is turned on, when the current in the switch returns to zero. An output capacitor in parallel with the load is large enough to smooth the effect of time variations in the output current delivered to the load so that the output voltage of the converter is an essentially DC value. An output voltage controls the frequency of the switch turn-on times in response to the output voltage at the load.

The switch may be a unipolar switch (e.g., a field effect transistor or an insulated gate bipolar transistor) capable of withstanding a unipolar voltage when turned off, the polarity of the unipolar voltage defining positive and negative poles on the switch, and capable of carrying a unipolar current, when turned on, between the positive and negative poles. A unidirectional conducting device may be connected in parallel with the unipolar switch, the unidirectional conducting device being poled so that it conducts current in the direction opposite to the direction of conduction of the unipolar switch.

The saturable inductor has a sufficiently low value of resistance so that it dissipates a relatively low amount of power during periods of forward conduction by the switch.

Other advantages and features will become apparent from the following description, and from the claims.

DESCRIPTION

We first describe the drawings:

FIG. 4 shows a circuit model for a coupled inductor.

Figure 9:
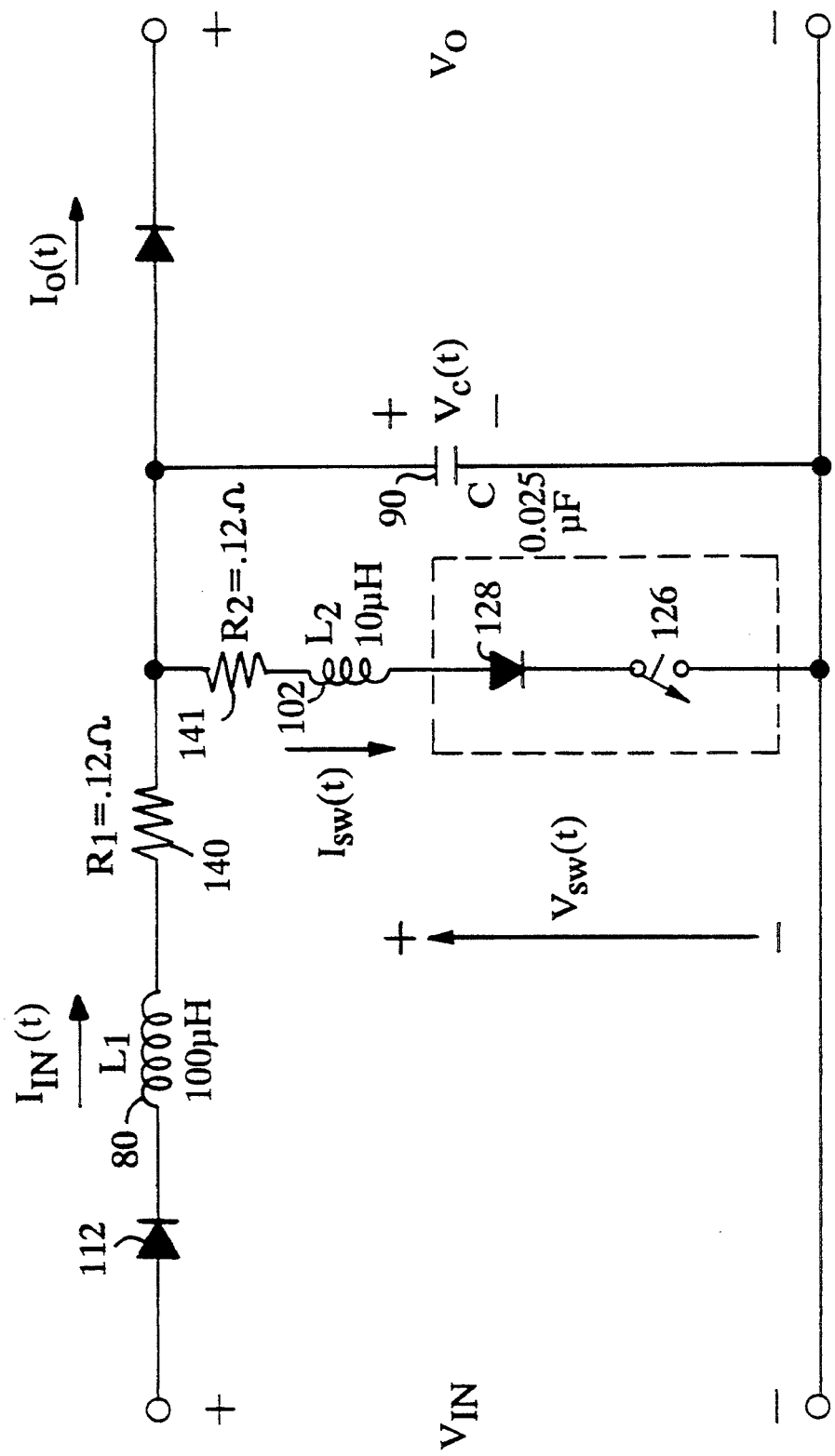
FIG. 9 shows an embodiment of a prior art zero-current switching boost converter of the kind shown in FIG. 1 which includes a composite switch of the kind shown in FIG. 8A.
Figure 10:
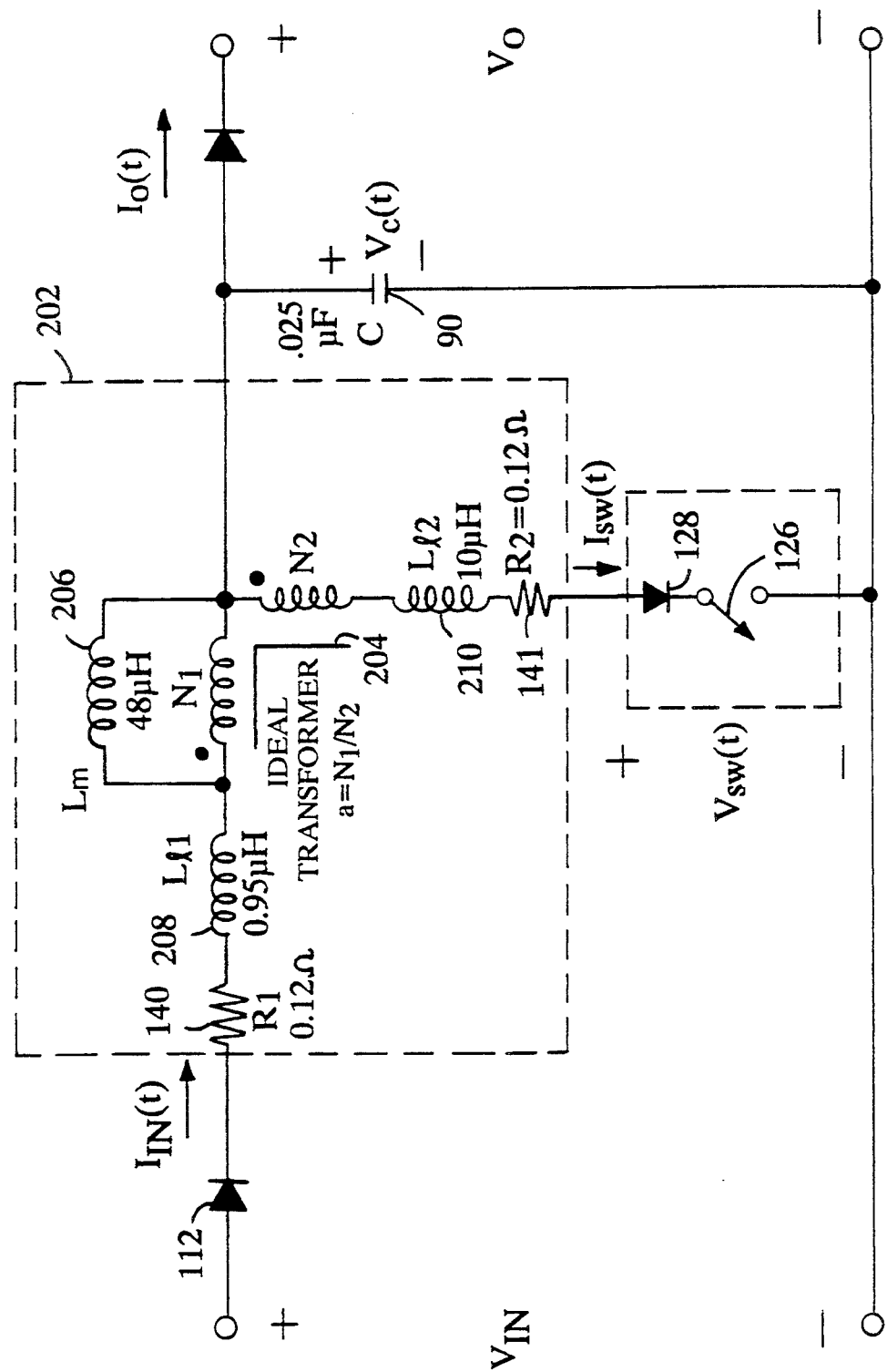
FIG. 10 shows an embodiment of a zero-current switching boost converter of the kind shown in FIG. 3 which includes a composite switch of the kind shown in FIG. 8A.
Figure 11:
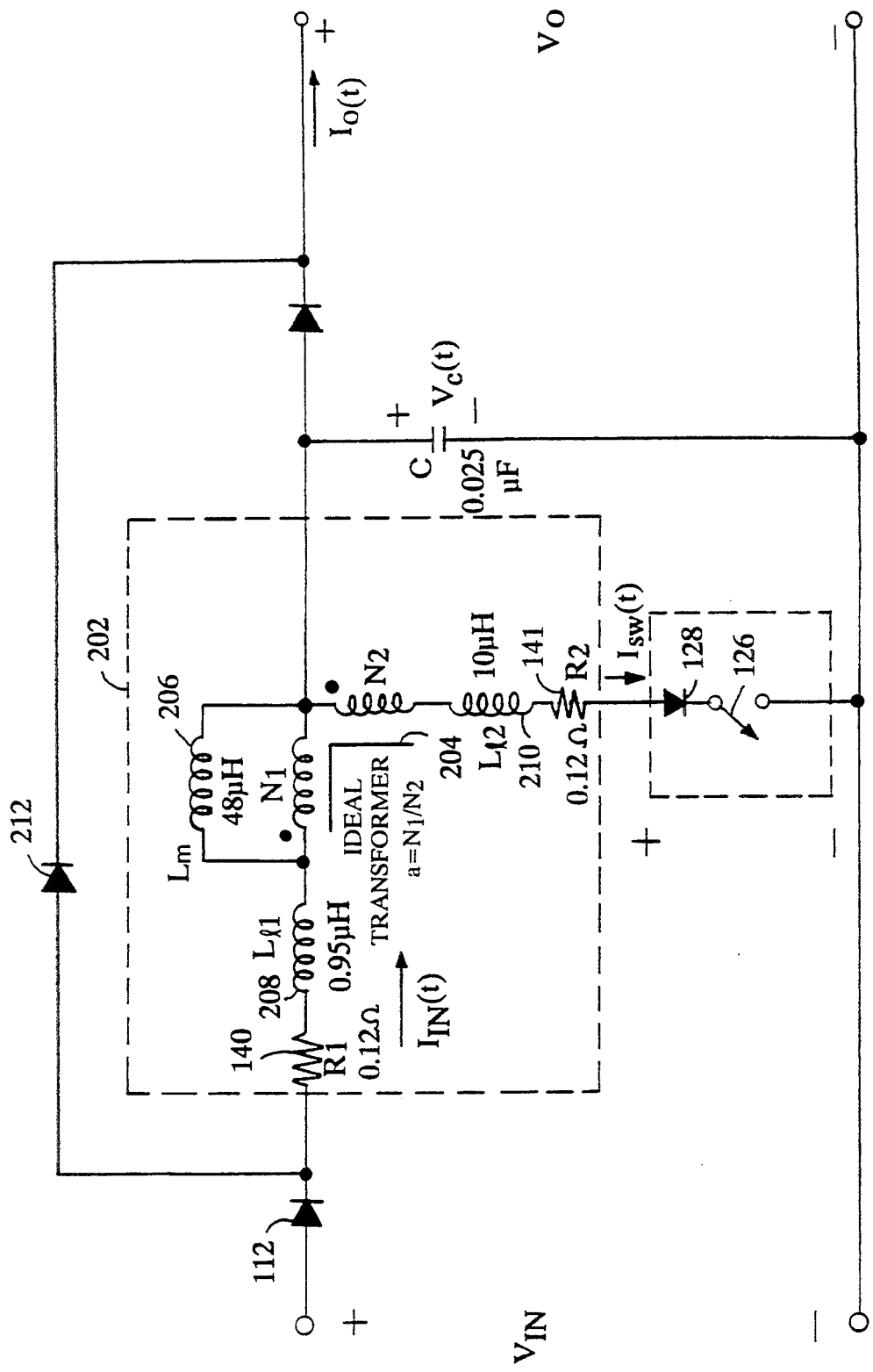
FIG. 11 shows an embodiment of a zero-current switching boost converter of the kind shown in FIG. 7 which includes a composite switch of the kind shown in FIG. 8A.

FIG. 15 tabulates the peak negative value of capacitor voltage which occurs in the converters of FIGS. 9, 10, and 11 under various specified operating conditions.

FIG. 16 tabulates the peak negative value of voltage which the blocking diode must withstand in the converters of FIGS. 9, 10, and 11 under various specified operating conditions.

Figure 17:
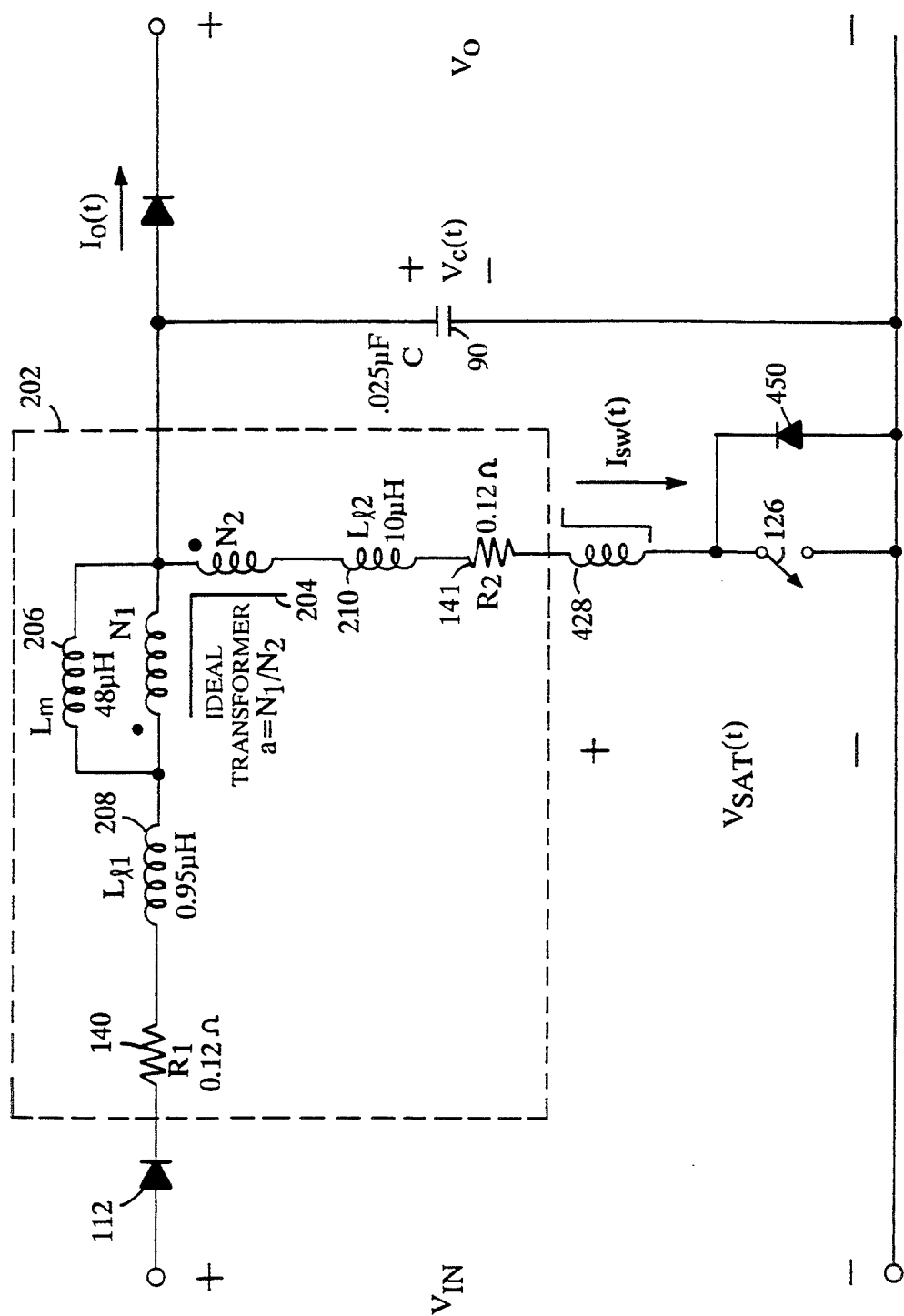

FIG. 17 show one embodiment of a zero-current switching boost converter according to the present invention.

Figure 18:
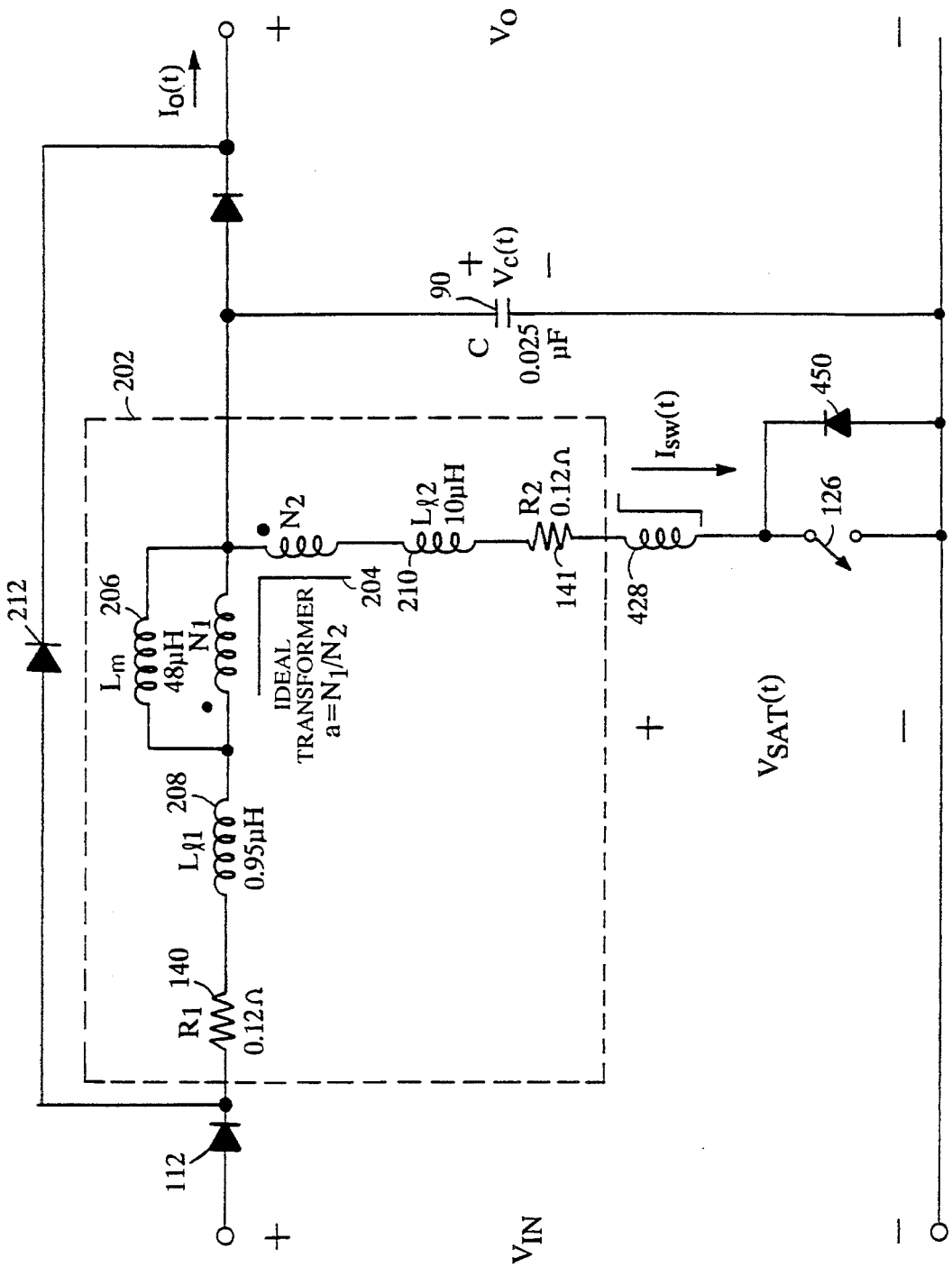

FIG. 18 shows another embodiment of a zero-current switching boost converter according to the present invention.

Figure 19A:
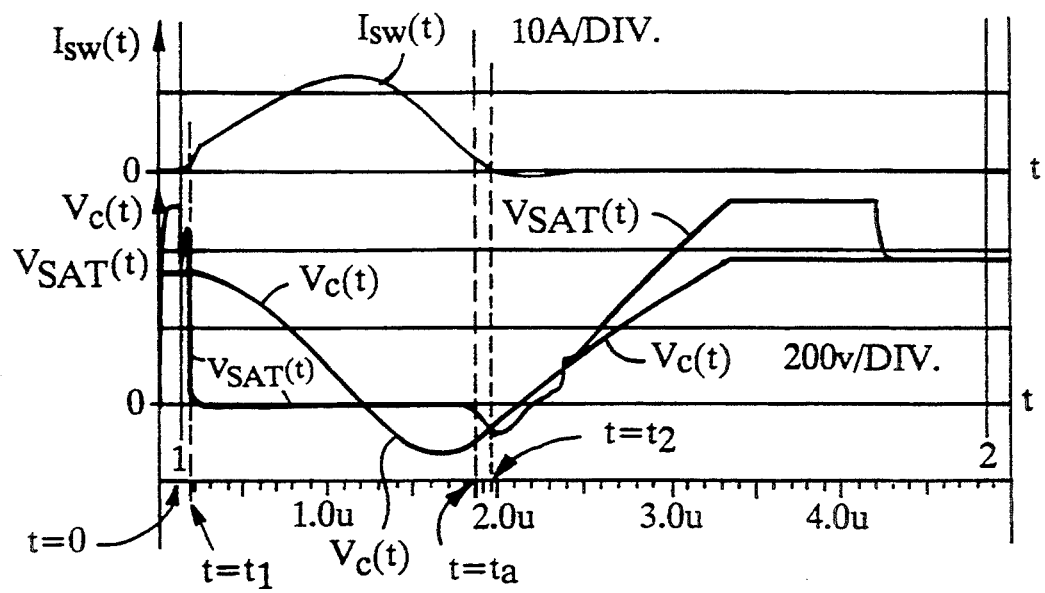
Figure 19B:
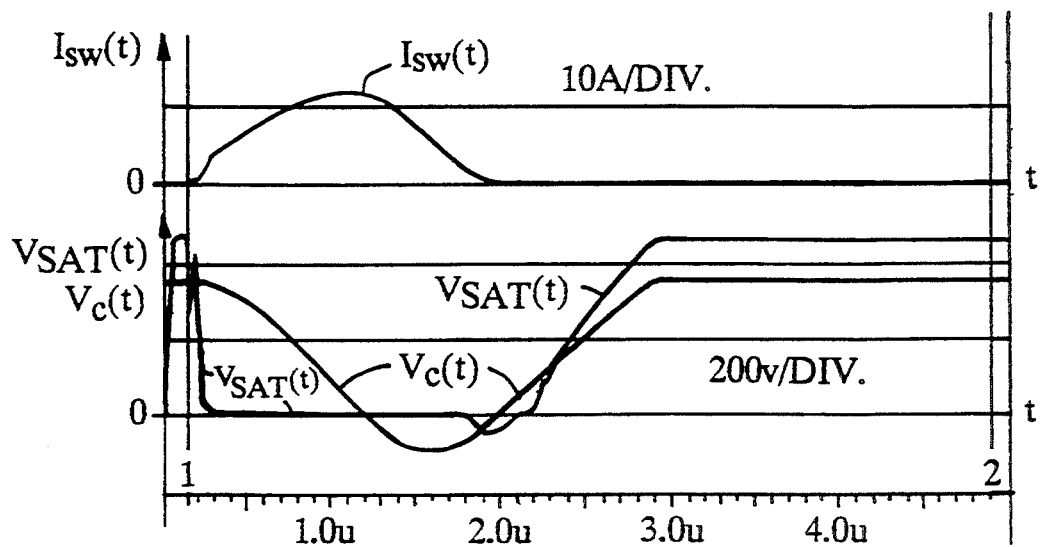

FIGS. 19A and 19B show waveforms from an exemplary simulation of the converter of FIG. 17.

Figure 20A:
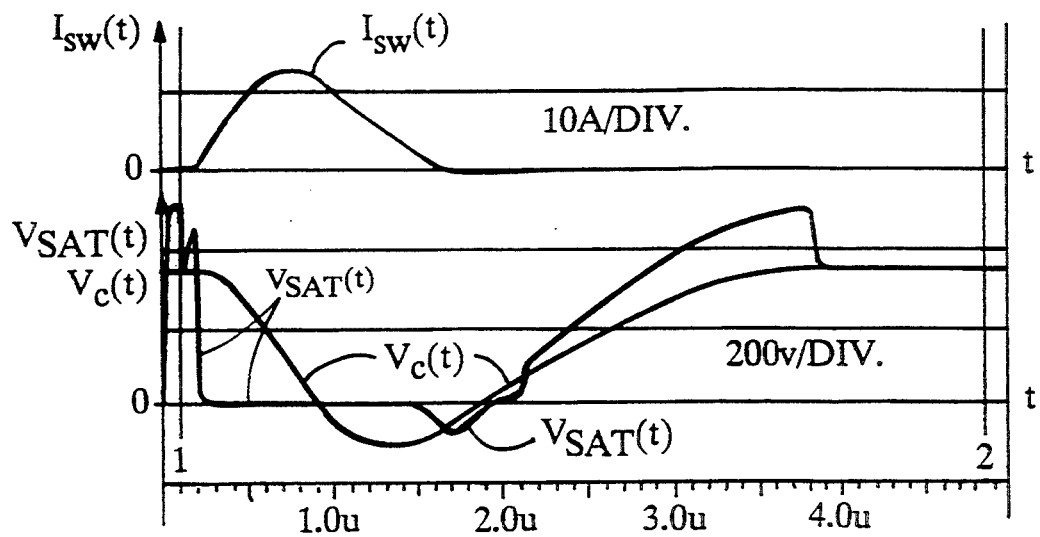
Figure 20B:
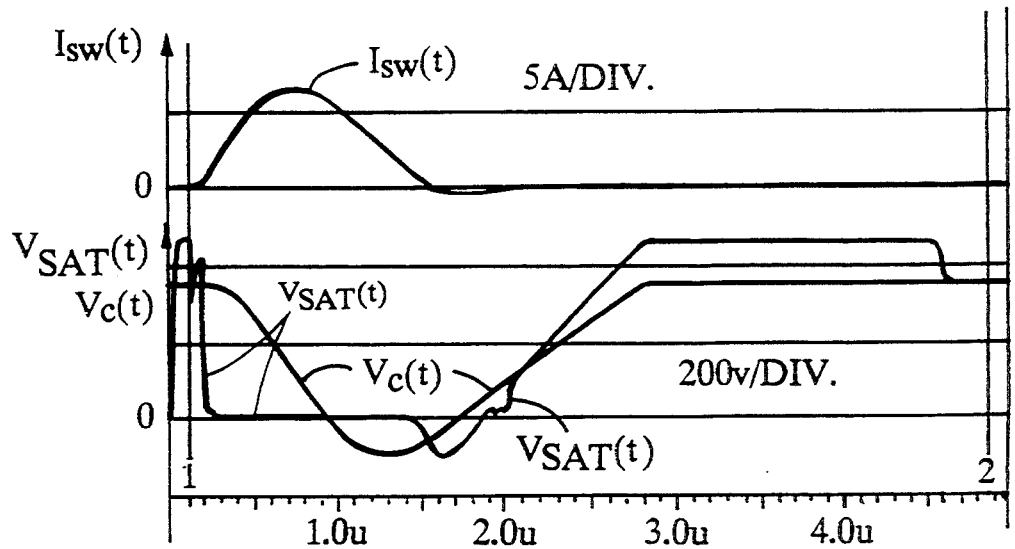

FIGS. 20A and 20B show waveforms from an exemplary simulation of the converter of FIG. 18.

FIG. 21 tabulates the peak negative value of capacitor voltage which occurs in the converters of FIGS. 17 and 18 under various specified operating conditions.

FIG. 22 tabulates the peak negative value of voltage which the saturable inductor must withstand in the converters of FIGS. 9, 10, and 11 under various specified operating conditions.

FIGS. 23A and 23B show combinations of diodes and switching elements for use in zero-current switching boost converters according to the present invention.

Figure 24:
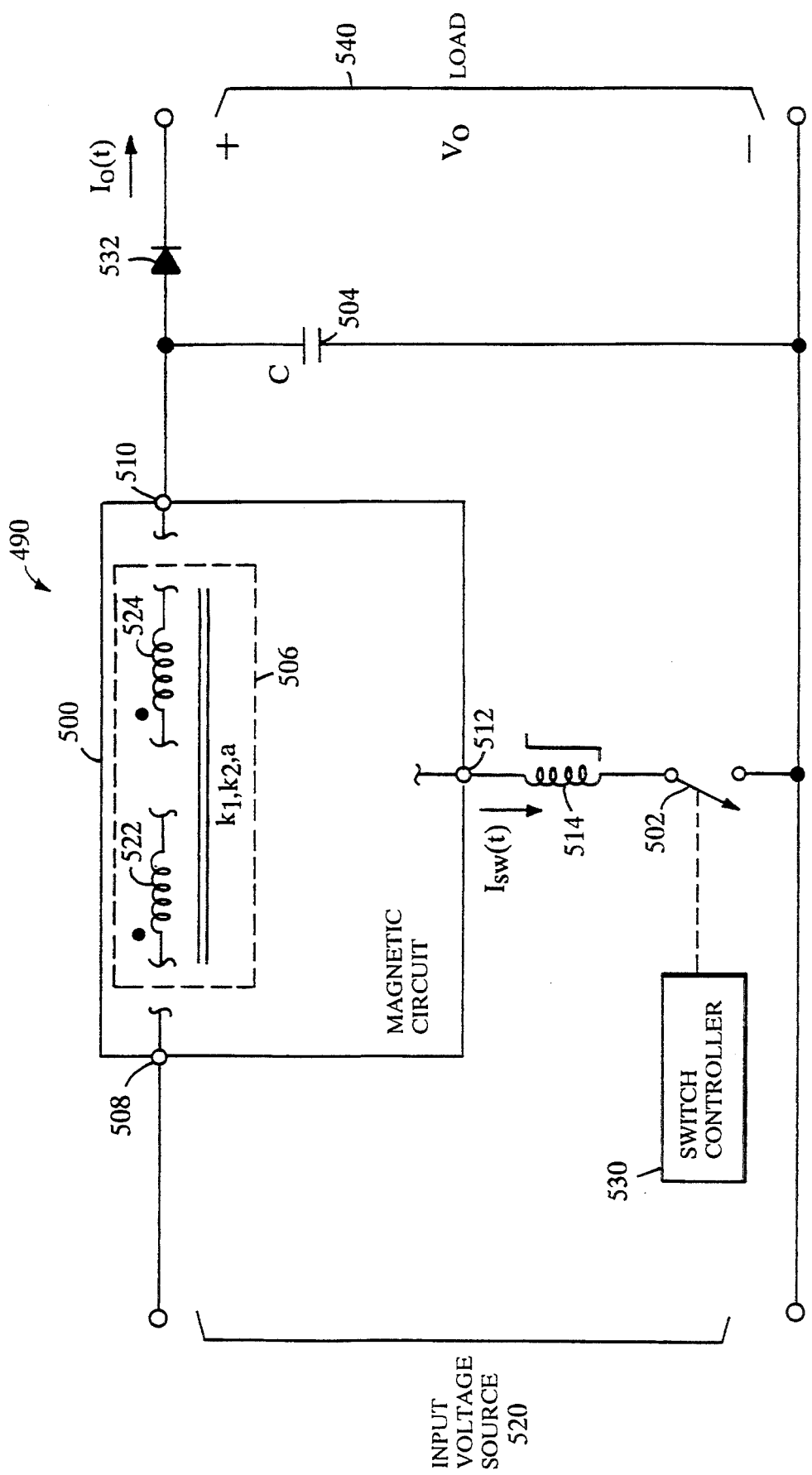

FIG. 24 shows a general circuit topology for a zero-current switching boost converter according to the present invention.

FIGS. 25A through 25E show embodiments of zero-current switching boost converters according to the present invention.

Figure 26:
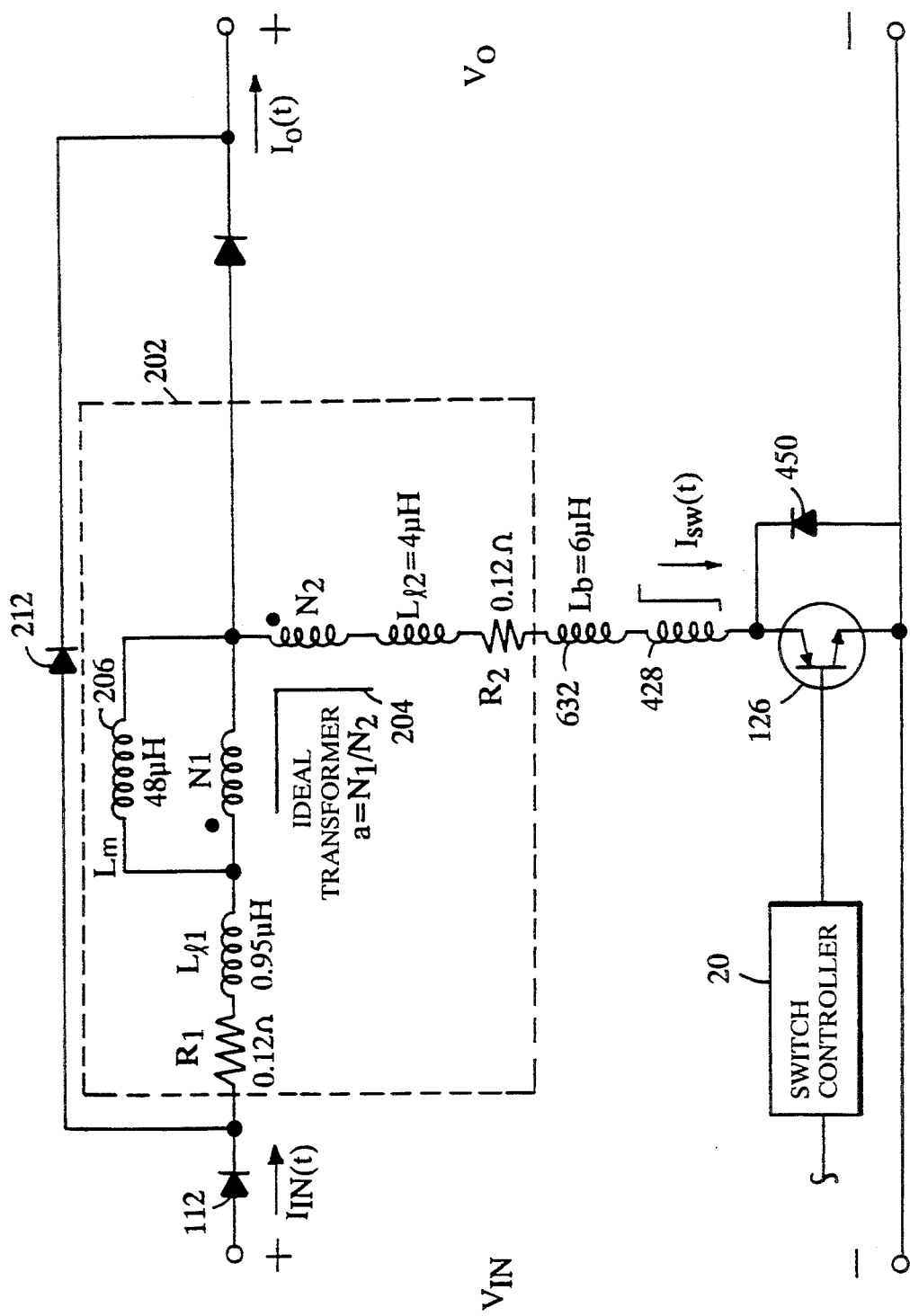

FIG. 26 shows another embodiment of a zero-current switching boost converter according to the present invention.

Figure 27A:
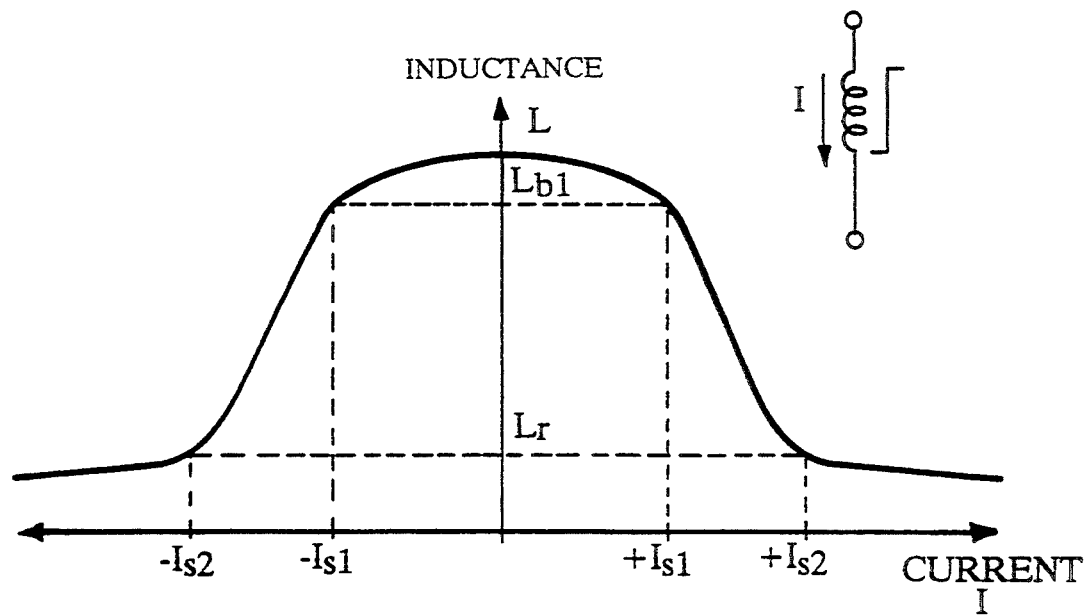
Figure 27B:
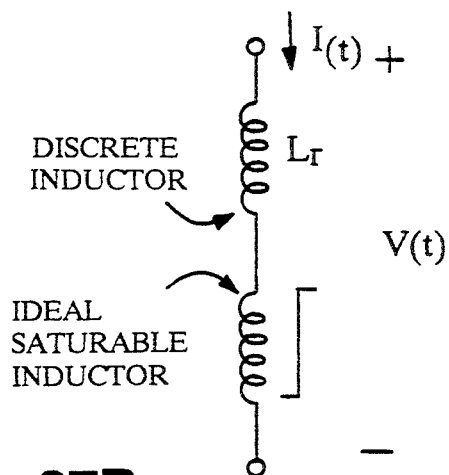

FIGS. 27A and 27B illustrate the relationship between current and inductance in a saturable inductor and show a circuit model for the device.

Figure 28:
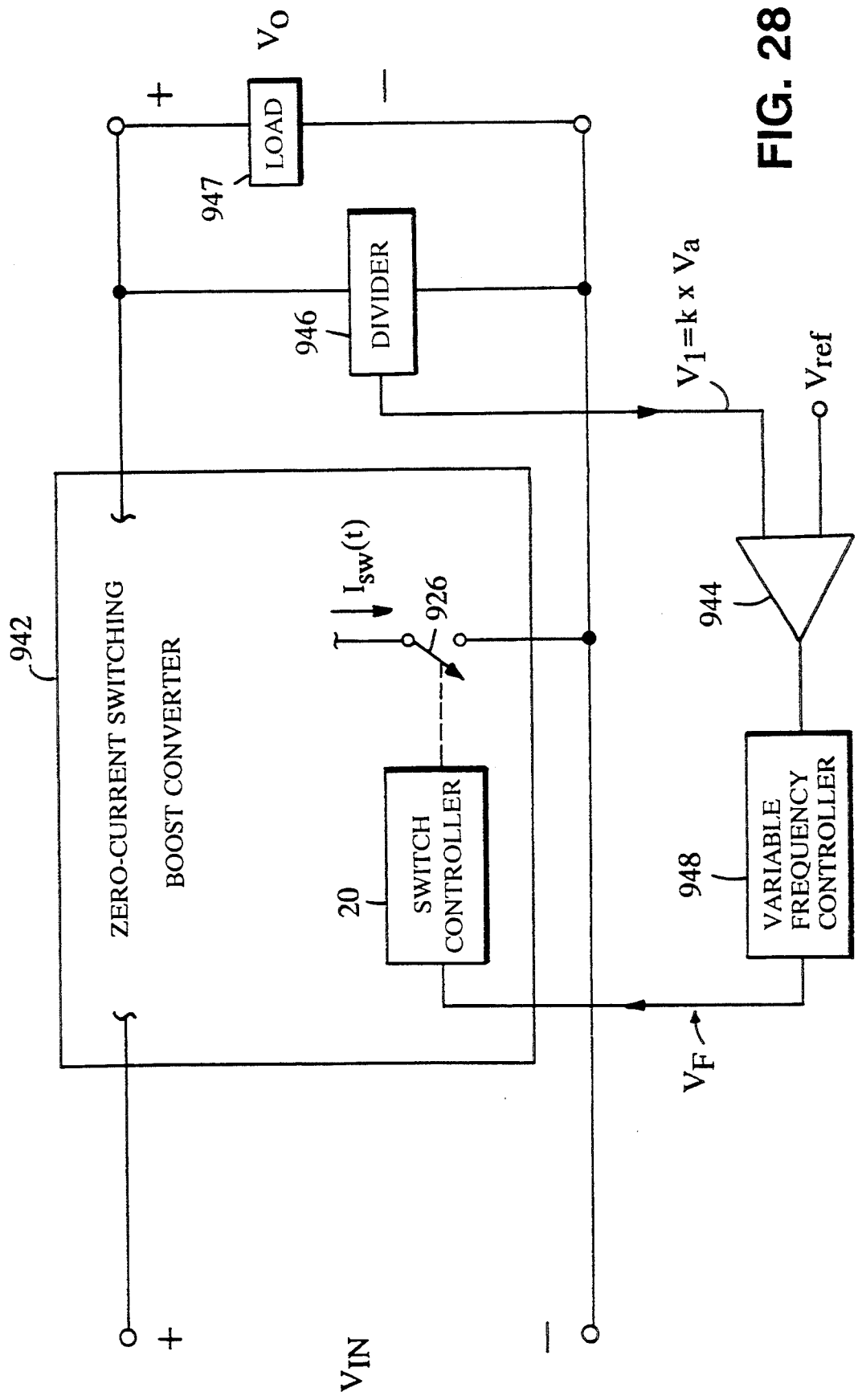

FIG. 28 shows a zero-current-switching boost switching power converter and a controller for maintaining the output voltage of the converter at some desired value as the converter input voltage and load vary.

Figure 29:
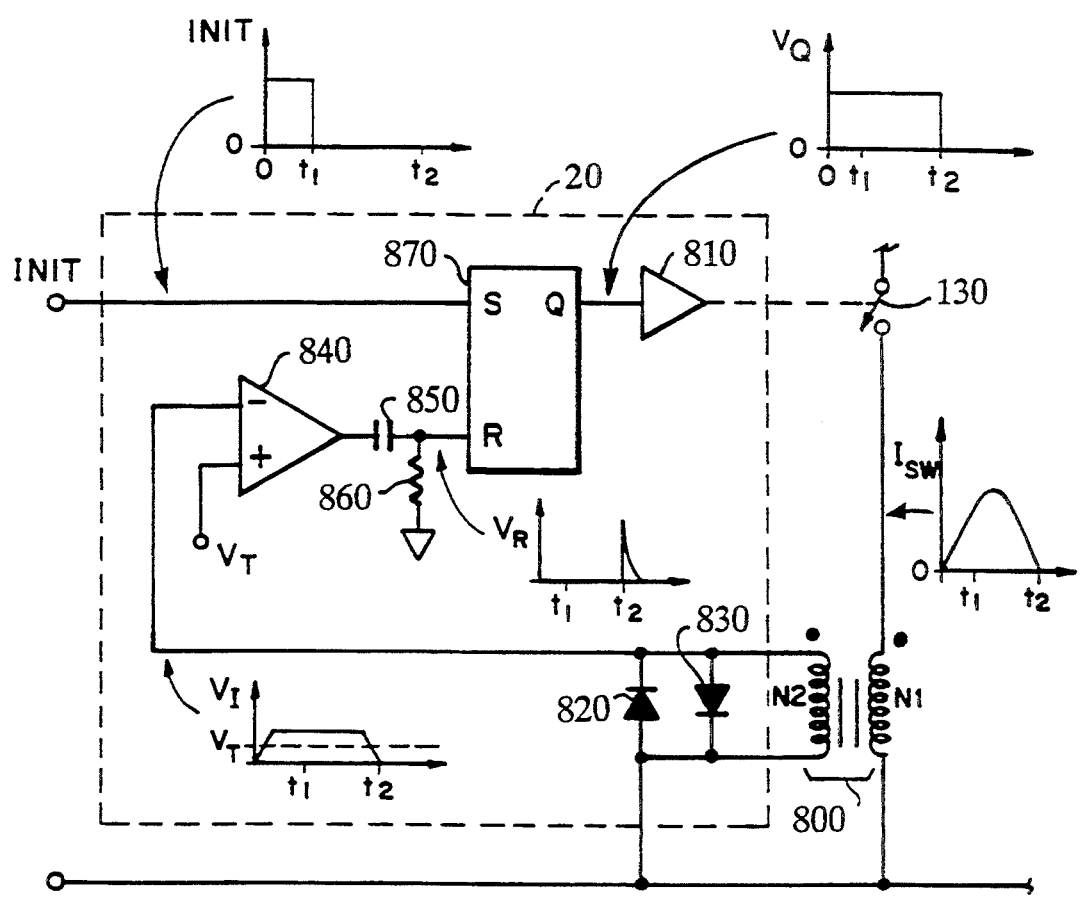

FIG. 29 shows an implementation of a switch controller suitable for operating a zero-current switching boost converter in the short cycle mode.

Figure 1:
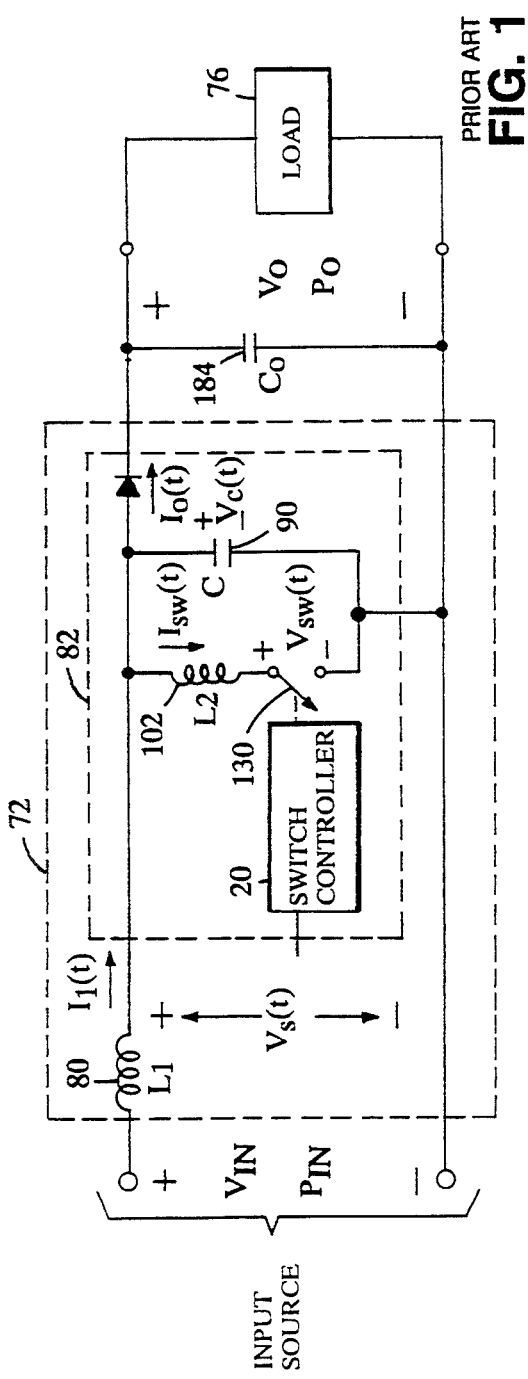
FIG. 1 shows one embodiment of a prior-art zero-current switching boost converter which includes discrete inductors.
Figure 2:
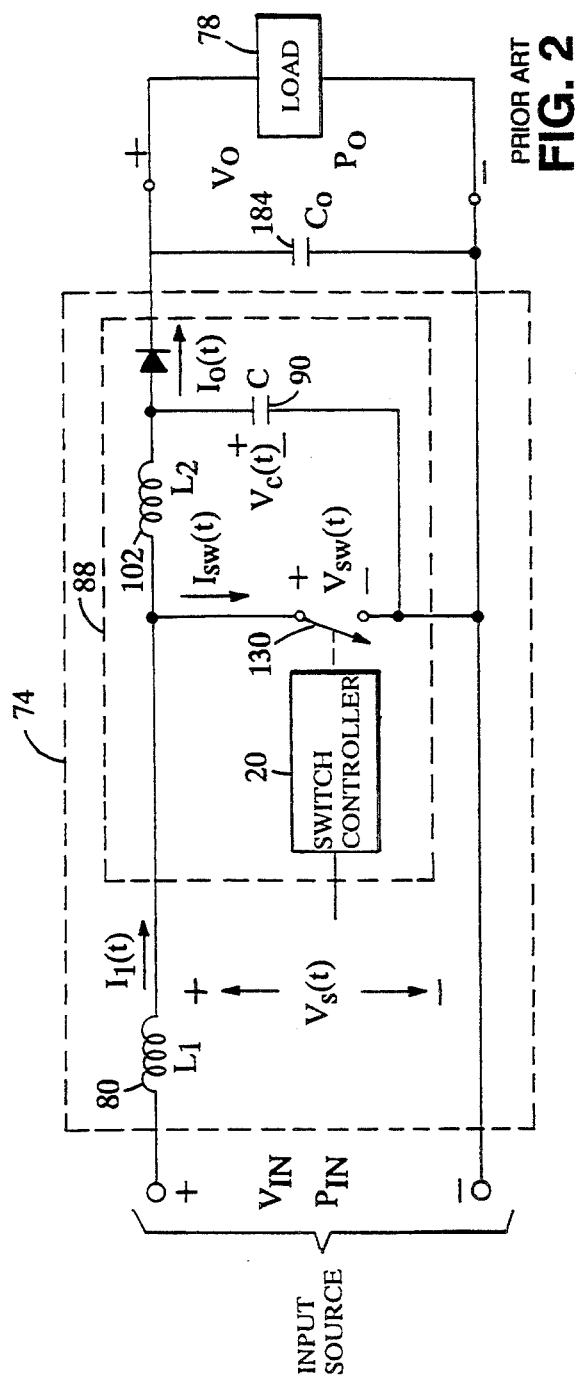
FIG. 2 shows another embodiment of a prior-art zero-current switching boost converter which includes discrete inductors.
Figure 3A:
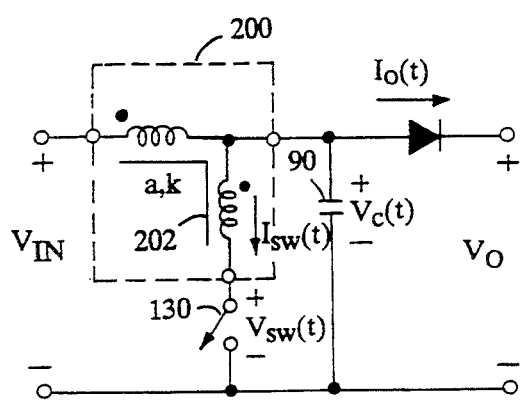
FIGS. 3A through 3E show embodiments of zero-current switching boost converter which include coupled inductors.
Figure 3B:
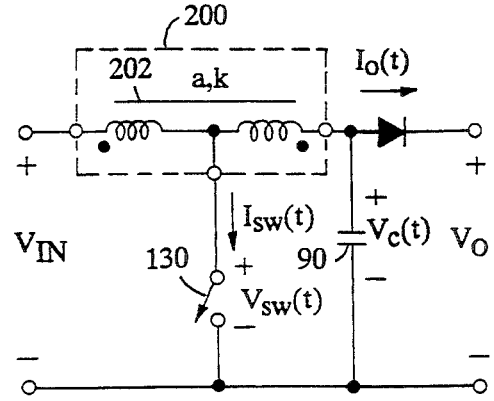
Figure 3C:
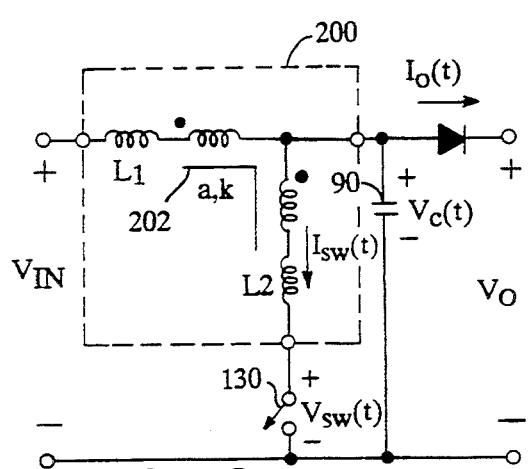
Figure 3D:
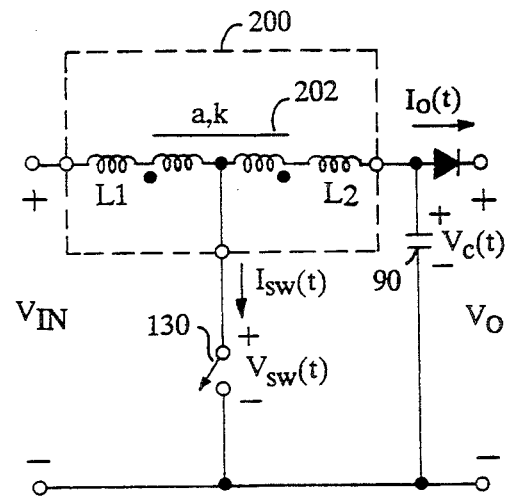
Figure 3E:
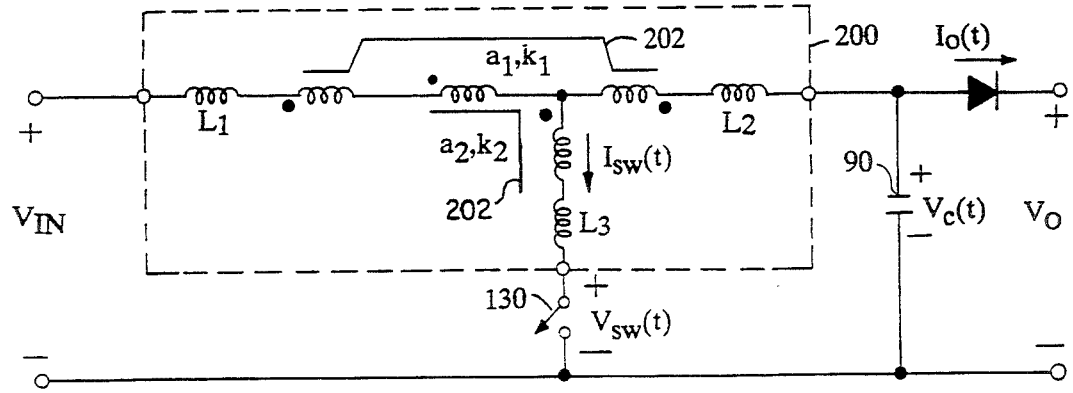

Examples of prior art zero-current switching boost converters 72, 74 are shown in FIGS. 1 and 2. In the Figures, the converters include both a discrete first inductor 80, labeled L1, and a discrete second inductor 102, labeled L2. We consider the two inductors to be discrete in the sense that there is essentially no magnetic coupling between them. FIGS. 3A through 3E show zero-current boost switching converters, of the kind disclosed in Vinciarelli, U.S. patent application Ser. No. 07/722,537, filed Jun. 27, 1991, which include magnetic circuits 200 including coupled inductors 202. In general, boost converters of the kind shown in FIGS. 1, 2, and 3, and those in accordance with the present invention, as described below, are intended to supply power to a voltage-sinking load (i.e., a load which appears as an essentially constant source of voltage over time periods which are long relative to a converter operating cycle). An output capacitor connected across the output terminals of the boost converter, of a capacitance value sufficiently large so that it smooths the effect of time variations in the output current which is delivered by the converter to the load, is frequently used to make the load appear to the converter as a voltage sinking load. The application of such a capacitor 184 is shown in the converters of FIGS. 1 and 2, but, for generality and clarity, is not shown in the remainder of the Figures.

In the converters of FIG. 3, the coupled inductors 202 are of the conventional kind where the windings are not perfectly coupled. Thus, each winding has an inductance value which combines a "leakage inductance" (equivalent to a lumped inductance associated with that portion of the flux in the winding which does not couple into the other winding) and a "magnetizing inductance" (representative of the inductance associated with flux that links both windings). As a circuit element, such a structure exhibits transformer action which is moderated by the effects of the leakage inductances. A conventional circuit model for a coupled inductor having two windings is shown in FIG. 4. In the Figure, the coupled inductor consists of a primary winding having N1 turns and a secondary winding having N2 turns. The coupling coefficients of the two windings are k1 and k2, respectively ($0 \leq k1, k2 \leq 1$). The effect of flux linkage between the windings is represented by an ideal transformer 204 having a turns ratio a=N1/N2 and a lumped magnetizing inductance, of value Lm 206. The leakage inductances of the primary and secondary windings are represented by lumped inductors 208, 210 of value L11 and L12, respectively. The relative values of the lumped inductors, L11, L12 and the magnetizing inductance Lm are dependent on the magnetic properties of the media linking the windings (e.g., the permeability of the magnetic material used) and the construction of the coupled inductor (e.g., N1, N2, k1 and k2). The total inductance of the primary winding alone is Lpri=L11+Lm; the total inductance of the secondary winding alone is Lsec=L12+Lm/$a^2$. To first order, the relationships between L11, L12, and Lm are shown in FIG. 4 for both the general case (k1 not equal to k2) and for the case where k1=k2=k.

Figure 6A:
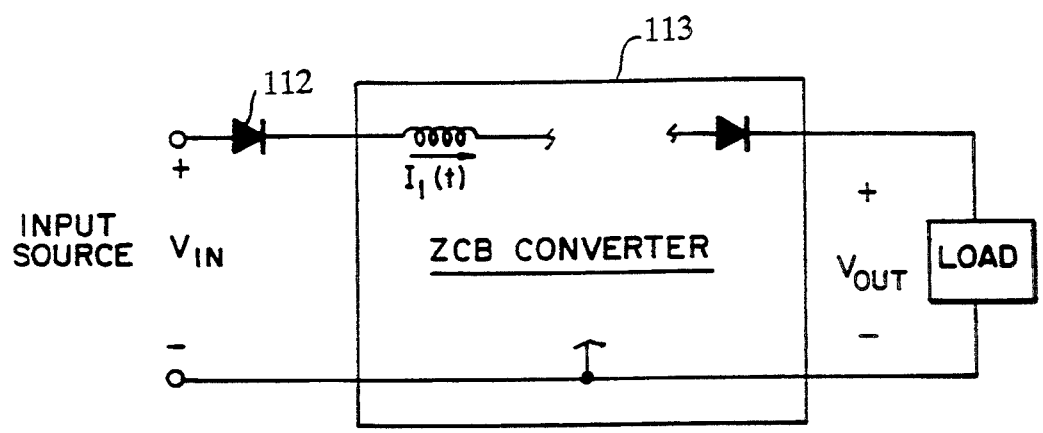
FIG. 6A and 6B shows input unidirectional devices connected between an input voltage source and a zero-current switching boost converter.
Figure 6B:
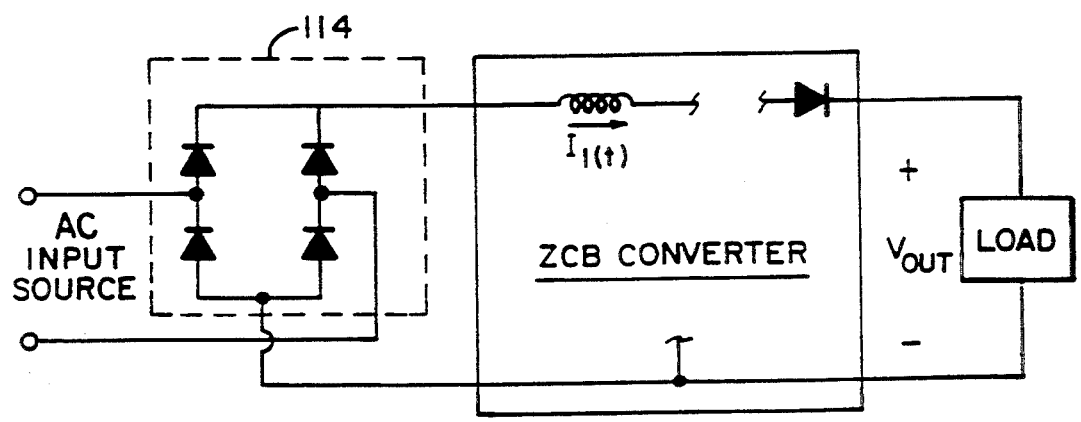
Figure 7A:
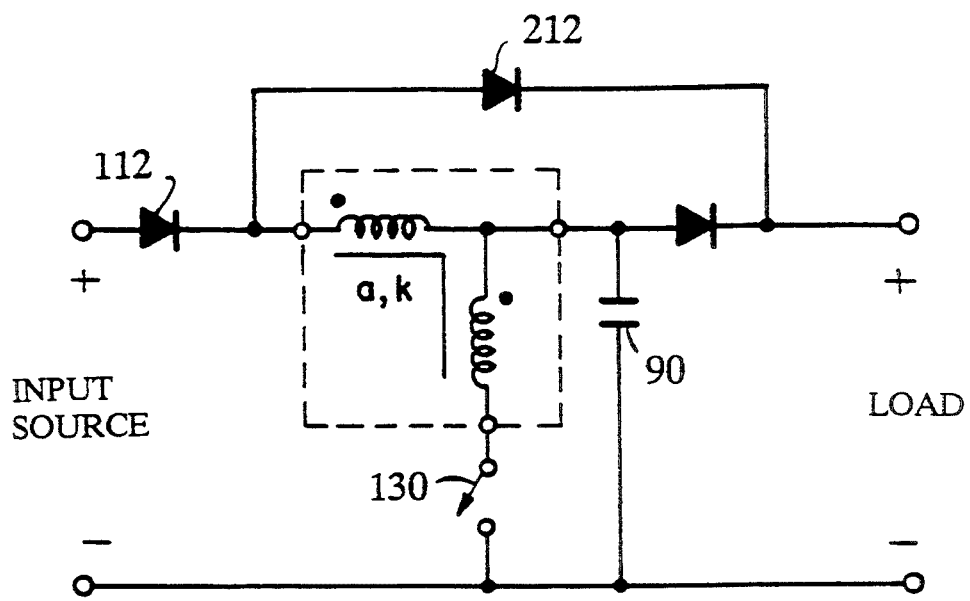
FIGS. 7A through 7D show embodiments of zero-current switching boost converters which include both an input unidirectional conducting device and a forward unidirectional conducting device.
Figure 7B:
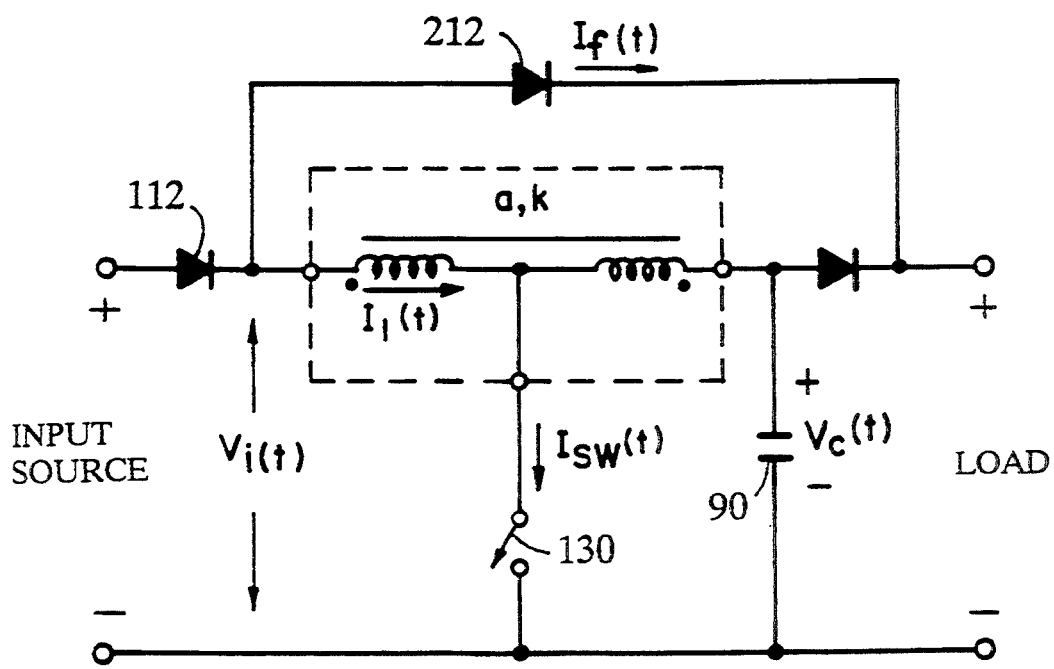
Figure 7C:
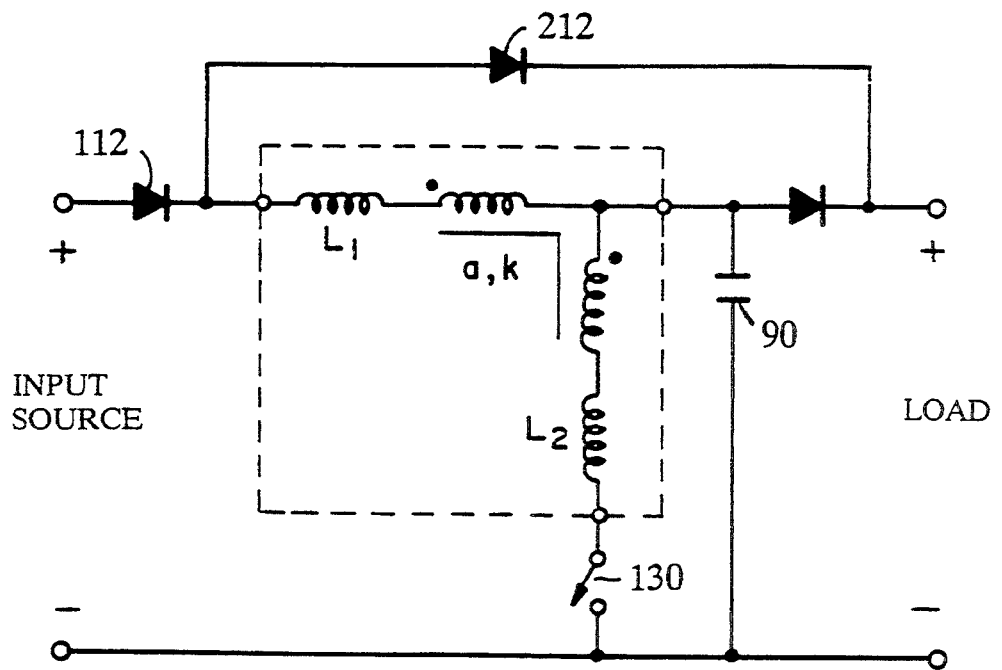
Figure 7D:
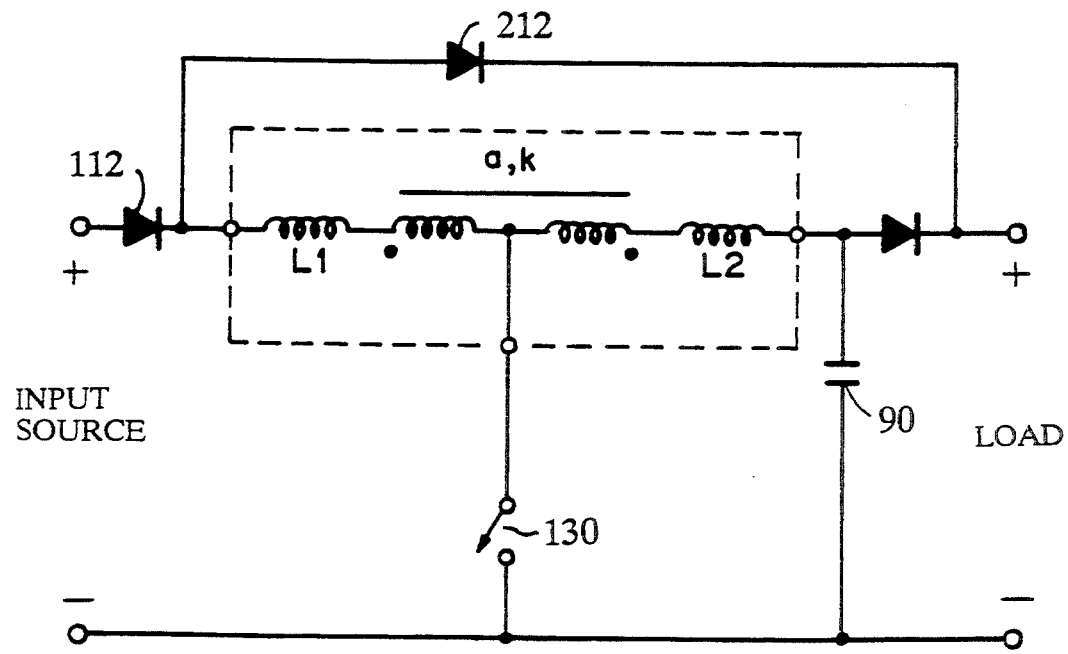

Any of the converters shown in FIGS. 1, 2 or 3, and any of the zero-current switching converters described below, would also include a switch controller (shown as switch controller 20 in FIGS. 1 and 2, but which may or may not be shown in the remainder of the figures) of a kind typical of that described in the references, which turns the switch on and off at times of at zero current and which controls the rate at which the switch is turned on as a means of controlling the ratio of the load voltage to the voltage delivered by the input source. Where the input source to the boost converter is a rectified source of AC voltage (as illustrated in FIG. 6B, for example), the controller might be of the kind used in a power factor preregulator (see, for example, Wilkerson, U.S. Pat. No. 4,677,366; Williams, U.S. Pat. No. 4,940,929; and Vinciarelli, U.S. patent application Ser. No. 07/642,232, filed Jan. 16, 1991), where the rate at which the switch is turned on is controlled so as to maintain the output voltage of the boost converter at some predetermined value while simultaneously forcing the input current drawn from the AC source to follow the time-varying waveform of the AC voltage.

An operating cycle typical of that found in any of the converters of FIGS. 1, 2 or 3, in an operating mode called the half-cycle mode, may be illustrated with reference to the waveforms shown in FIG. 5. For illustrative purposes we assume that: the input voltage to the converter is constant and equal to Vin; the converter output voltage is constant and equal to Vo (where Vo>Vin); that current, Iin(t), will flow continuously toward the converter input from the input source throughout the operating cycle; and that just prior to time t=0 the switch is open and the input and output currents, Iin(0) and Io(0) respectively, are of an equal value Iin. At time t=0 the switch is closed (by the switch controller, previously described). Between t=0 and t=t1 the switch current, Isw(t), ramps up and the output current, Io(t), ramps down until, at time t=t1, the current Io(t) becomes equal to zero and the output unidirectional conducting device ceases conducting. At time t1 an essentially lossless energy transfer cycle begins during which energy is transferred between the capacitor (e.g., capacitor 90 in FIGS. 1, 2, and 3) and inductive elements in the converter. During the energy transfer cycle the switch current and the capacitor voltage vary sinusoidally until, at time t=t2, the switch current first returns to zero. For the conditions specified, the sinusoidal variations in the switch current and capacitor voltage will exhibit a characteristic time constant (i.e. the time period over which the sinusoid completes a half-cycle) which is closely approximated by Tc=$\pi$sqrt(L2*C) in the converters of FIGS. 1 and 2 (since, in practical implementations, the relative value of L1 is large compared to L2 in such converters); whereas in the converters of FIG. 3 the characteristic time constant will be Tc=$\pi$sqrt(Le*C), where Le is the total equivalent inductance looking back from the capacitor toward the input source, and where Le is primarily a function of the leakage inductances of the coupled inductor windings. At time t=t2 the switch is opened (by the switch controller) and, owing to the negative value of the capacitor voltage Vc(t2)=−Vc, the voltage across the open switch rises to a negative value Vsw(t2)=−Vx. Between time t=t2 and t=t3 energy associated with current flow in the input inductor charges the capacitor back toward the output voltage. At time t3 the capacitor voltage equals Vo, the output unidirectional conducting device starts to conduct and current Io(t) flows toward the load. Another operating cycle is shown starting at time t=t4.

Alternate embodiments of zero-current switching boost converters, as disclosed in Vinciarelli, U.S. patent application Ser. No. 07/722,537, filed Jun. 27, 1991, are illustrated in FIGS. 6A and 6B and in FIGS. 7A through 7D. In FIG. 6A an input unidirectional conducting device 112 is placed in series with a zero-current switching boost converter 113 which can be any of the converters of FIGS. 1, 2 or 3. At relatively high values of converter load, for which input current, Iin(t), flows continuously in a direction from the input source toward the converter, the operation of the converter is essentially unaffected by the presence of the input unidirectional conducting device. For relatively low values of load, however, where input current might tend to reverse, the presence of the input unidirectional conducting device 112 can prevent undesirable resonant current flow between the capacitor and the input source. In an important class of applications, where the input power to the boost converter is derived by rectifying an AC prime power source (e.g. in a power factor correcting preregulator, for example), the rectifier (e.g., rectifier 114, FIG. 6B) can perform the function of the input unidirectional conducting device. In the converters of FIGS. 7A through 7D, both an input unidirectional conducting device 112 and a forward unidirectional conducting device 212 are included in the converter. As discussed in Vinciarelli, U.S. patent application Ser. No. 07/722,537, filed Jun. 27, 1991, the combination of the two devices provides a path for current to flow between the capacitor 90 and converter output during a portion of the energy transfer cycle (e.g. between time t=t1 and t=t2 in FIG. 5). For converters of the kind shown in FIGS. 6 and 7 the characteristic time constant is a function of the values of the capacitor 90 and the circuit inductances.

Figure 5:
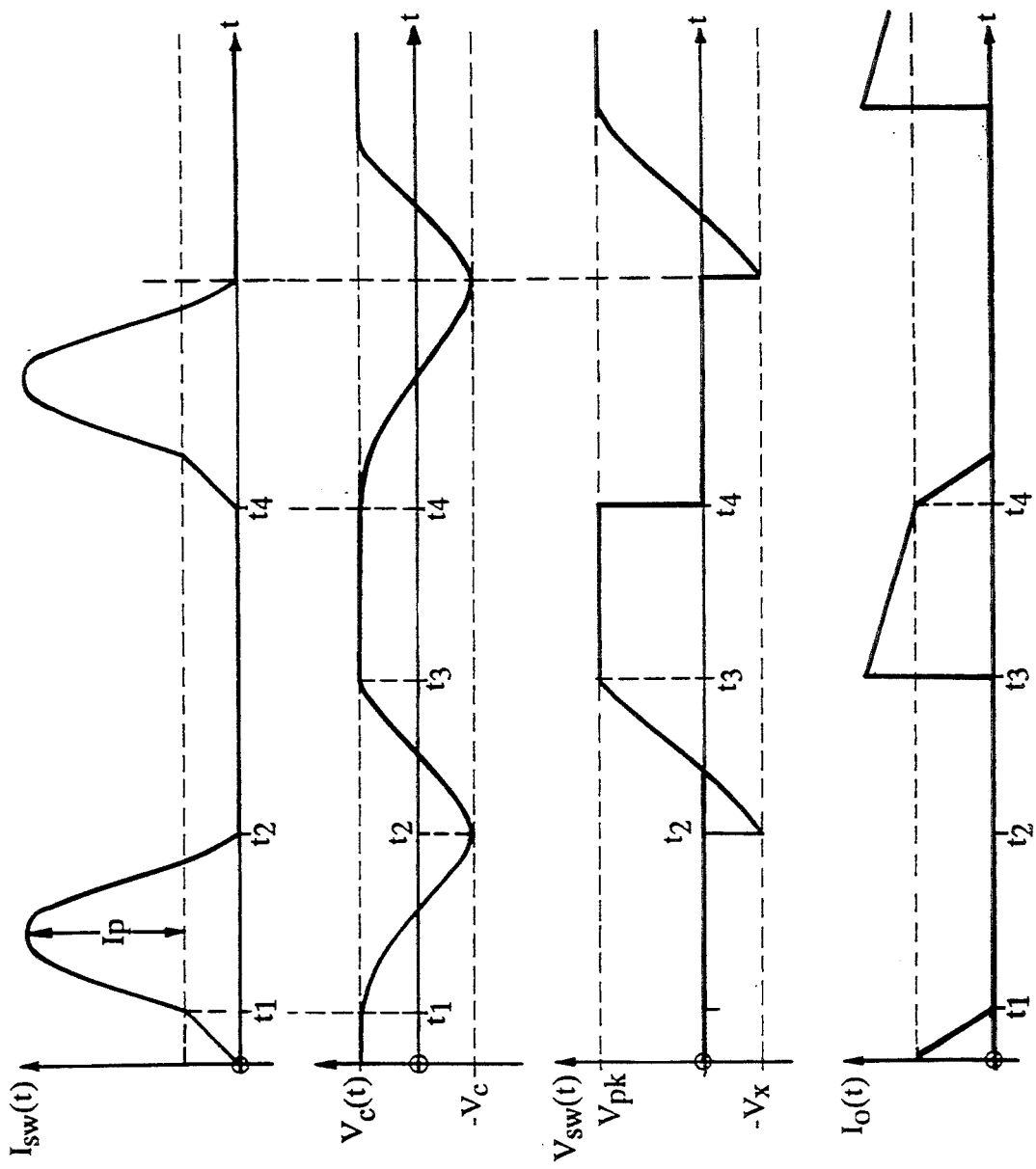
FIG. 5 shows waveforms typical of those found in the converters of FIGS. 1, 2, or 3 when operating in a half-cycle mode of operation.
Figure 8C:
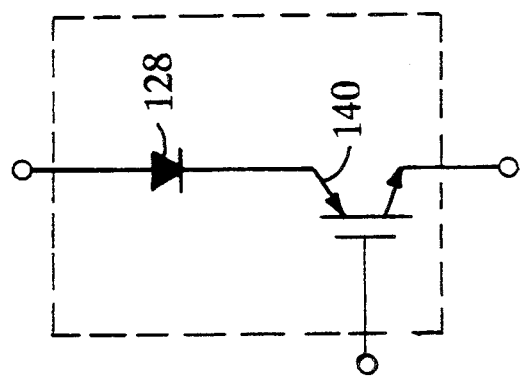
FIGS. 8A through 8C show prior art implementations of composite switching elements for use in a zero-current switching boost converter operating in the half-cycle mode of operation.
Figure 8B:
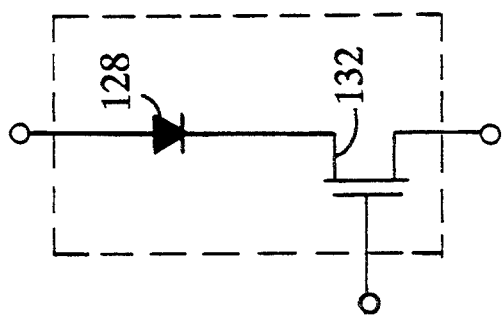
Figure 8A:
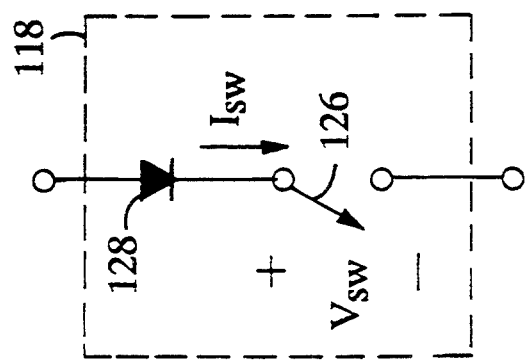

When operated in the half-cycle mode, the switch 130 included in any of the converters of FIGS. 1, 2, 3, 6 or 7 must withstand both negative and positive voltages (e.g. between times t2 and t4 in FIG. 5). As a practical matter, switching elements which can support both positive and negative voltages when open, and which exhibit switching speeds consistent with efficient converter operation at relatively high operating frequencies (e.g. 300 KHz or 500 KHz) are not currently available, and prior art converters which operate in the short-cycle mode have made use of switch configurations of the kind shown in FIG. 8. In FIG. 8A the composite switching element 118 consists of a unidirectional switch 126 (i.e. one capable of carrying current in the direction of the arrow when on, and able to support a positive voltage, Vsw, when off) in series with a blocking diode 128. The blocking diode is selected to: (a) support an appropriate value of negative voltage when the unidirectional switch is off, and (b) exhibit a reverse recovery time which is relatively fast relative to a converter operating cycle (to minimize momentary reverse current flow in the diode when the unidirectional switch is turned off). FIGS. 8B and 8C illustrate implementations where the unidirectional switch is a field effect transistor 132 and an insulated gate bipolar transistor (IGBT) 140, respectively. In using such a composite switch, current flow in the blocking diode 128 results in heat loss which reduces the overall operating efficiency (i.e. the ratio of power delivered by the converter to the load to the power delivered by the input source) of the converter. Thus, although the operating efficiency of a zero-current switching boost converter operating in the short-cycle mode might be expected to be higher than the efficiency of a converter operating in a long-cycle mode (because the time period during which the switching element carries current is minimized in the short-cycle mode), the potential for improved efficiency inherent to the short-cycle mode is counteracted by the losses attendant to the composite switch.

Figure 12A:
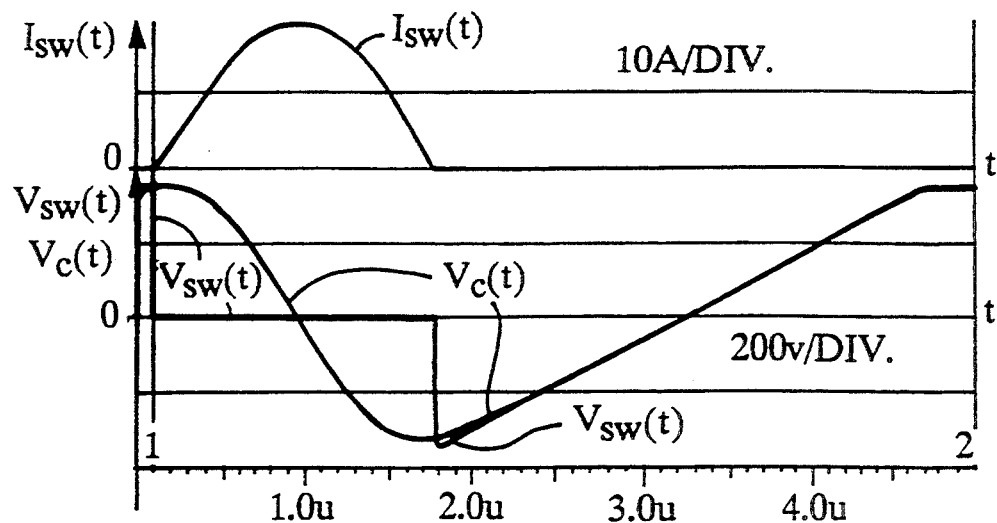
FIGS. 12A and 12B show waveforms from an exemplary simulation of the converter of FIG. 9.
Figure 12B:
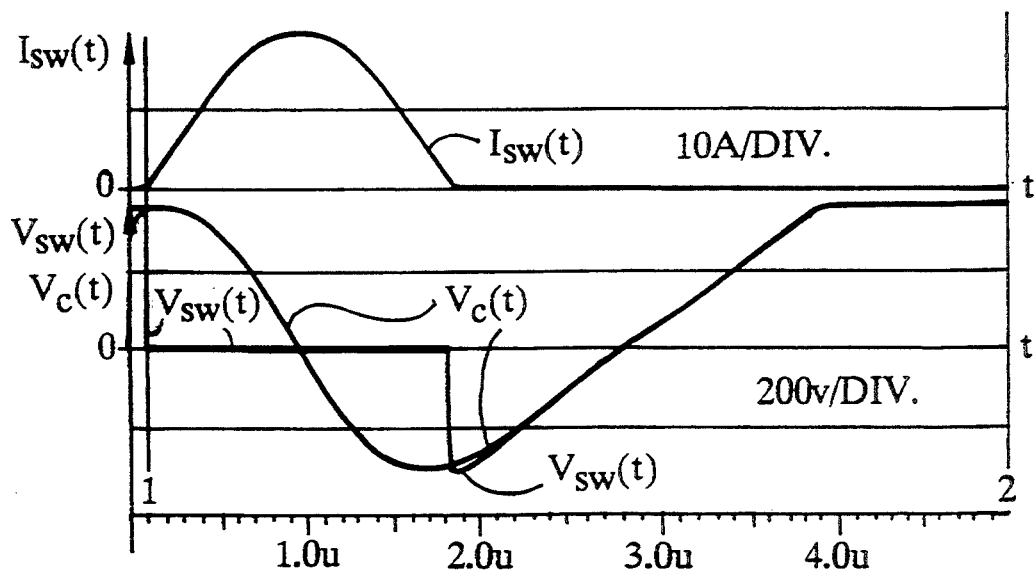
Figure 13A:
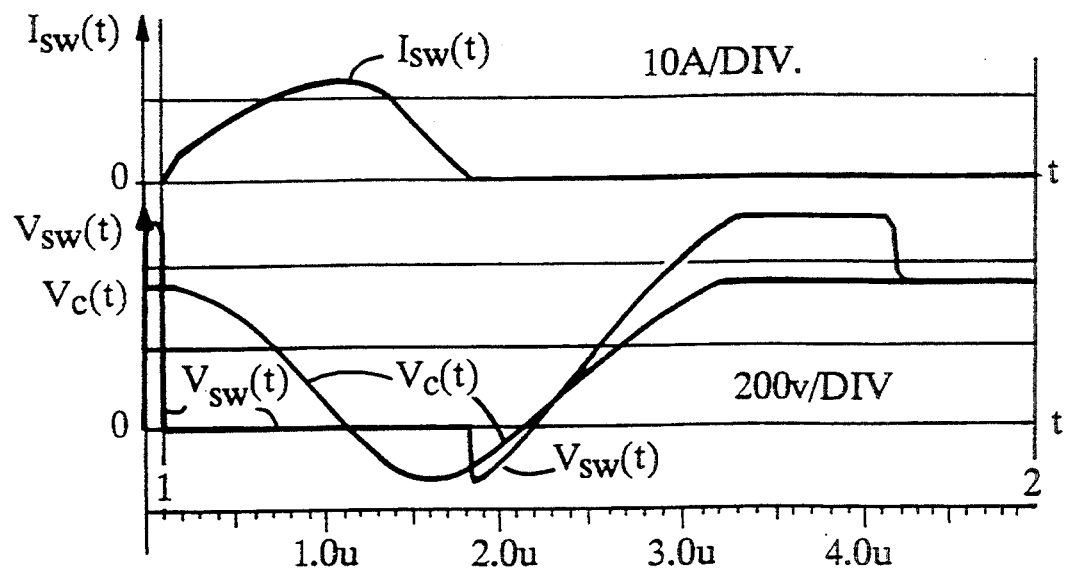
FIGS. 13A and 13B show waveforms from an exemplary simulation of the converter of FIG. 10.
Figure 13B:
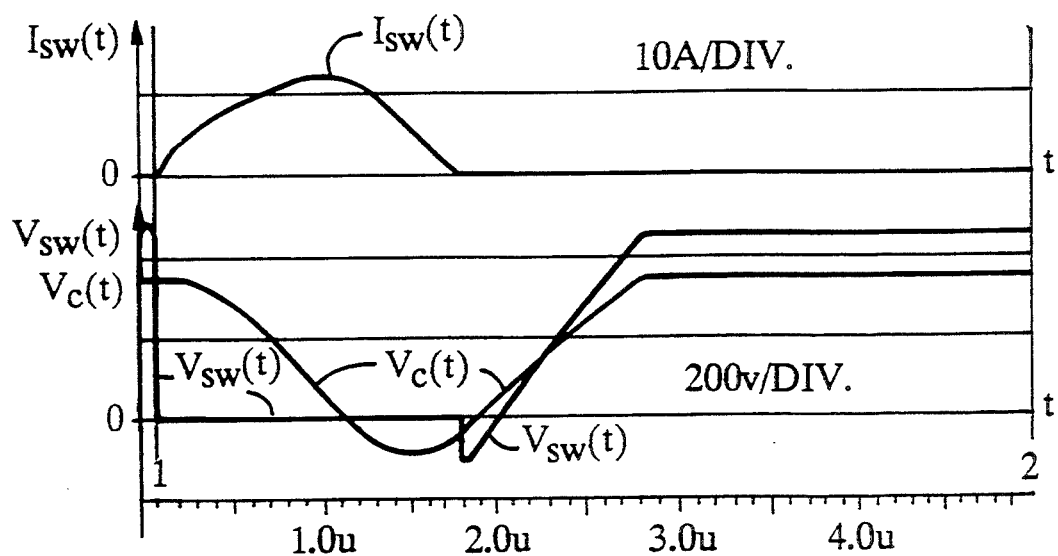
Figure 14A:
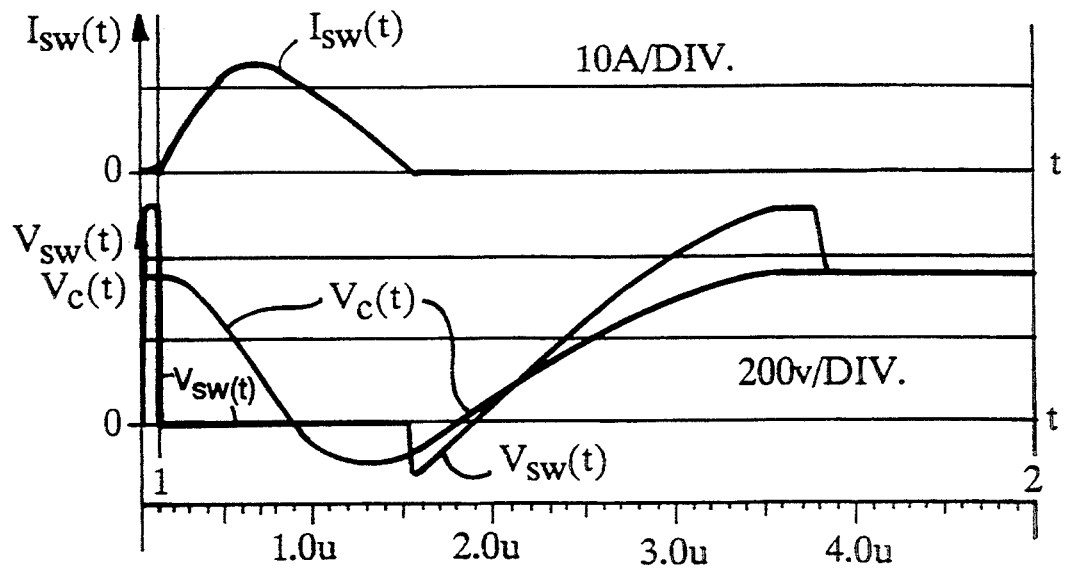
FIGS. 14A and 14B show waveforms from an exemplary simulation of the converter of FIG. 11.
Figure 14B:
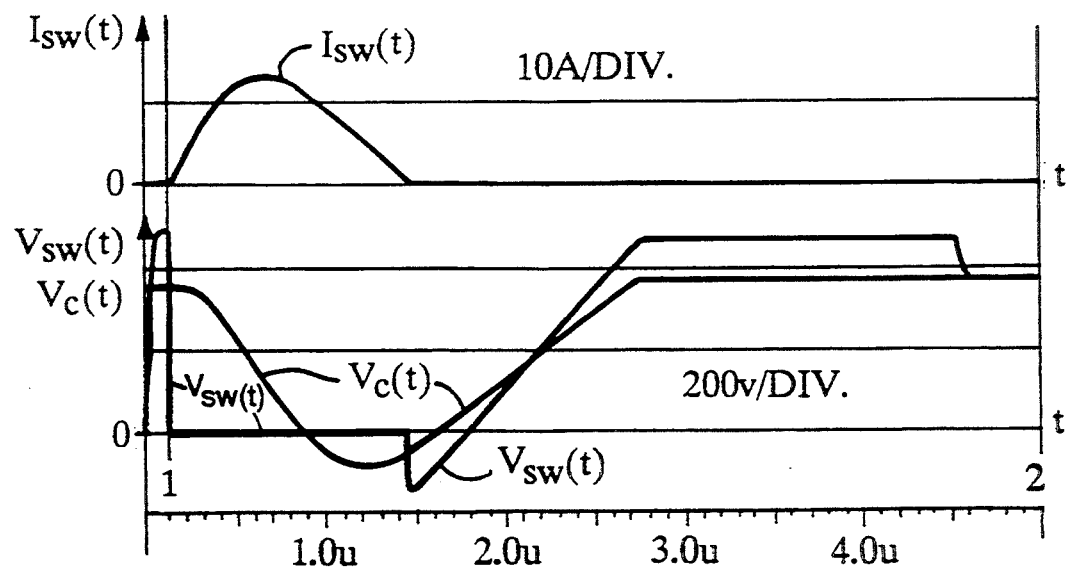

A key difference between the prior-art converters of the kind shown in FIGS. 1 and 2 (e.g. the kind which use discrete inductors) and those of FIGS. 3 and 7 (e.g. the kind which use coupled inductors) is that, for given values of Vin, Vout and converter loading, the converters of FIGS. 3 and 7 may be arranged to exhibit lower values of peak negative voltage across both the blocking diode and the capacitor at the time that the switch is opened. For example, FIGS. 12A and 12B, 13A and 13B, and 14A and 14B show waveforms of exemplary simulations of the zero-current switching boost converters of FIGS. 9, 10 and 11, respectively. The converter of FIG. 9 is of the kind shown in FIG. 1 and includes an input unidirectional conducting device 112 of the kind shown in FIG. 6; the converter of FIG. 10 is of the kind shown in FIG. 3A and also includes an input unidirectional conducting device 112 of the kind shown in FIG. 6; the converter of FIG. 11 is of the kind shown in FIG. 7A, including both an input unidirectional conducting device 112 and a forward unidirectional conducting device 212. For the converter of FIG. 9, the value of L1 80 is 100 microhenry, the value of L2 102 is 10 microhenry, and the value of C 90 is 0.025 microfarad. For the converters of FIGS. 10 and 11, the coupled inductors 202 are characterized by first and second leakage inductances, L11 and L12, of values 0.95 microhenry and 10 microhenry, respectively, turns ratio N1/N2=a=2, a magnetizing inductance Lm=48 microhenries, and a value of C 90 equal to 0.025 microfarad. In all cases a small amount of resistance 140, 141, of values shown in the Figures, has been incorporated into each winding of each magnetic element. In FIGS. 12A, 13A and 14A the converter input voltage is 50 VDC, the converter output voltage is 350 VDC and the input (and output) current of the converter, at a time 100 nanoseconds prior to closing the switch, is 3 Amperes. In FIGS. 12B, 13B and 14B the converter input voltage is 150 VDC, the converter output voltage is 350 VDC and the input (and output) current of the converter, at a time 100 nanoseconds prior to closing the switch, is 3 Amperes. The peak negative capacitor 90 voltage, and the peak negative voltage which must be withstood by the blocking diode 128 are, for the converter of FIG. 9 operating as shown in FIG. 12A, 333 Volts and 330 Volts respectively. The peak negative capacitor voltage, and the peak negative voltage which must be withstood by the blocking diode are, for the converter of FIG. 10 operating as shown in FIG. 13A, 137 Volts and 154 Volts respectively. The peak negative capacitor voltage, and the peak negative voltage which must be withstood by the blocking diode are, for the converter of FIG. 11 operating as shown in FIG. 14A, 116 Volts and 145 Volts respectively. The peak negative capacitor voltage, and the peak negative voltage which must be withstood by the blocking diode are, for the converter of FIG. 9 operating as shown in FIG. 12B, 315 Volts and 299 Volts respectively. The peak negative capacitor voltage, and the peak negative voltage which must be withstood by the blocking diode are, for the converter of FIG. 10 operating as shown in FIG. 13B, 97.8 Volts and 119 Volts respectively. The peak negative capacitor voltage, and the peak negative voltage which must be withstood by the blocking diode are, for the converter of FIG. 11 operating as shown in FIG. 14B, 100 Volts and 166 Volts respectively. For the examples shown, the coupled converters (FIGS. 10 and 11) exhibit lower values of peak negative voltage across both the capacitor 90 and the blocking diode 128.

The results of additional exemplary simulations of the converter circuits of FIGS. 9, 10, and 11 are shown in the tables in FIGS. 15 and 16. FIG. 15 compares the values of peak negative voltage which appears across the capacitor in the converter of FIG. 9 with the values which appear in the converter of FIGS. 10 and 11, at the time that the switch is opened, for different converter operating conditions and for different arrangements of coupled inductors. FIG. 16 tabulates the voltage which must be withstood by the blocking diode for the same operating conditions and converter arrangements. In all cases, the initial input current is the current which is flowing into the converter 100 nanoseconds prior to closing the switch and the converter output voltage is 350 Volts DC. In general, the voltage values in the tables of FIGS. 15 and 16 illustrate that increased turns ratio in the coupled inductor mitigates toward increased values of peak negative voltages, and that, by appropriate arrangement of circuit values, the peak negative voltages under consideration may be made much smaller in the converters which utilize coupled inductors (i.e. of the kinds shown in FIGS. 3 and 7) than in the prior art converters which use discrete inductors (i.e. of the kind shown in FIGS. 1 and 2). In the prior art converters (e.g. the converters of the kind shown in FIGS. 1 and 2) the maximum values of the peak negative voltages increase as load decreases and are of an absolute value which is relatively close to the converter output voltage. It can be shown that achieving a reduction in the values of the peak negative voltages in the prior art converter requires reducing the ratio of L1 to L2, and that achieving reductions as significant as those which are achieved in the converters which incorporate coupled inductors would result in L1/L2 ratios which are impractical in practice (due to high peak input and switch currents and a resultant reduction in converter efficiency (i.e. the ratio of the average power delivered to the load to the average power delivered by the input source)).

With reference to FIGS. 5, 12, 13 and 14 it should be apparent that the total negative volt-seconds which must be withstood by the blocking diode 128 (i.e. the time integral of the voltage, Vsw(t), across the blocking diode over the time period during which the voltage is negative) may be reduced in converters using coupled inductors.

However, although this reduction in volt-seconds does beneficially reduce the required breakdown voltage rating of the blocking diode, it does not substantially reduce the dissipation in the blocking diode since:

(a) The fraction of the dissipation which results from forward current flow in the blocking diode (i.e. between time t=0 and t=t2 in FIG. 5) is essentially independent of topology. For example, if the blocking diode is assumed to have an essentially constant voltage drop, Vd, during forward conduction then the dissipation in the device may be closely approximated as Pd=Vd*Iavg, where Iavg is the average value of the current Isw(t). For any boost converter, the average current in the switch will, by Kirchoff's current law, be equal to Iavg=Iinavg−Ioavg, where Iinavg and Ioavg are the average input current to the converter and the average output current delivered by the converter to the load, respectively. Assuming ideal circuit components, it can be shown that:

$$\text{Iavg} = (P/\text{Vin})(1 - (\text{Vin}/\text{Vo})) \quad (1)$$

where P is the power delivered by the converter to the load and Vin and Vout are the input source voltage and the converter output voltage, respectively. Thus, for a fixed value of Vd, the dissipation due to forward current flow in such a blocking diode is not affected by a reduction in peak negative voltage across the device.

(b) The dissipation associated with reverse current flow during the reverse recovery time of the blocking diode, just after the switch is turned off (e.g. at time t=t2 in FIG. 5) can be a significant loss factor. This is especially a factor in converters which operate at relatively high frequencies (e.g. above 200 KHz), where reverse recovery losses may be comparable to forward conduction losses (i.e. as expressed in Equation 1).

The ability to reduce the negative volt-seconds which are withstood by the blocking diode in a zero-current switching converter using coupled inductors is exploited in a zero-current switching converter according to the present invention as a means of overcoming the efficiency penalties associated with the blocking diode. This is accomplished by using an appropriately selected saturable inductor in place of the blocking diode.

Saturable inductors are well known in the prior art. Such devices, which typically consist of a winding on a magnetic core having a known value of saturation flux density (i.e. the value of flux density below which the permeability of the core is relatively high and above which the value of the permeability of the core is relatively low), exhibit a relatively high value of inductance at relatively low values of current (e.g. values which do not cause the flux density in the core to exceed the saturation flux density) and a relatively much lower value of inductance at relatively higher currents (e.g. values which would otherwise cause the flux density in the core to exceed the saturation flux density). Viewed another way, if a voltage is applied across a saturable inductor the flux linking the winding at any instant in time will be proportional to the time integral of the voltage across the winding (i.e. the "volt-seconds" applied to the device). If the "volt-seconds" exceed a certain value (dependent upon the number of turns in the winding and the dimensions and saturation flux density of the core) the magnetic flux linking the core will exceed the saturation flux density and the inductance of the device will drop.

In the invention, the saturable inductor may be arranged to have a sufficiently low value of resistance so that it dissipates a relatively low amount of power during periods of forward conduction by the switch. Furthermore, the saturable inductor will not exhibit behavior equivalent to that of the reverse recovery phenomenon in the blocking diode, and the losses associated with such behavior will not be present. Examples of two such converters are shown in FIGS. 17 and 18. In both Figures the zero-current switching boost converter includes a saturable inductor (428) in series with the switch 126. Both converters include an input unidirectional conducting device 112, and the converter of FIG. 18 also includes a forward unidirectional conducting device 212. In both Figures the converter includes a coupled inductor 202 which provides for reducing the peak negative voltages which occur when the switch 126 is turned off. All circuit values are otherwise the same as those used in the circuits of FIGS. 10 and 11. The saturable inductor 428 in each circuit is configured to have an inductance of 11.6 microhenries at zero current; 1.7 microhenries at 1 Ampere; and a fraction of a microhenry above 5 amperes. In each Figure a diode 450, discussed below, is placed in parallel with the switch 126. The effects of the saturable inductors in the two converters may be illustrated with reference to FIGS. 19A and 19B and 20A and 20B, which show waveforms of exemplary simulations of the zero-current switching boost converters of FIGS. 17 and 18, respectively. For comparison with the simulations of FIGS. 12A, 13A and 14A the simulations of FIGS. 19A and 20A are performed with a converter input voltage of 50 VDC, a converter output voltage of 350 VDC and the input (and output) current of the converter, at a time 100 nanoseconds prior to closing the switch, set to 3 Amperes. Likewise, for comparison with the simulations of FIGS. 12B, 13B and 14B the simulations of FIG. 19B and 20B are performed with a converter input voltage of 150 VDC, a converter output voltage of 350 VDC and the input (and output) current of the converter, at a time 100 nanoseconds prior to closing the switch, of 3 Amperes. The peak negative capacitor voltage, and the peak negative voltage which must be withstood by the saturable inductor are, for the converter of FIG. 17 operating as shown in FIG. 19A, 136 Volts and 91 Volts respectively. The peak negative capacitor voltage, and the peak negative voltage which must be withstood by the saturable inductor are, for the converter of FIG. 18 operating as shown in FIG. 20A, 108 Volts and 80.8 Volts respectively. The peak negative capacitor voltage, and the peak negative voltage which must be withstood by the saturable inductor are, for the converter of FIG. 17 operating as shown in FIG. 19B, 96.7 Volts and 56.8 Volts respectively. The peak negative capacitor voltage, and the peak negative voltage which must be withstood by the saturable inductor are, for the converter of FIG. 18 operating as shown in FIG. 20B, 95.3 Volts and 100 Volts respectively. The results of additional exemplary simulations of the converter circuits of FIGS. 17 and 18 are shown in the tables in FIGS. 21 and 22. For ease in comparison, the table in FIG. 21 shows values of peak negative voltage which appear across the capacitor in the converters of FIGS. 17 and 18 for the same operating conditions used in the table of FIG. 15. Likewise, the table in FIG. 22 shows values of peak negative voltage which appear across the saturable inductor in the converters of FIGS. 17 and 18 for the same operating conditions used in the table of FIG. 16. As before, in all cases, the initial input current is the current which is flowing into the converter 100 nanoseconds prior to closing the switch and the converter output voltage is 350 Volts DC. In general, the voltage values in the tables of FIGS. 15, 16, 21 and 22 illustrate that the peak negative capacitor voltage values are comparable for comparable operating conditions in the converters of FIGS. 10, 11, 17 and 18 and that these voltages can be made significantly lower than the voltage values exhibited in the converter of FIG. 9. The voltages across the blocking device (i.e. the saturable inductor or the blocking diode) are lowest in the converters of FIGS. 17 and 18 and highest in the converter of FIG. 9.

The general effects of the saturable inductor on converter operation may be illustrated with reference to the simulation waveforms of FIG. 19A. At time t=0 the switch is closed and between time t=0 and t=t1 a portion of the output voltage appears across the relatively high inductance of the saturable reactor (waveform Vsat(t)). At time t=t1 the current in the saturable inductor has risen above approximately 1 ampere and the inductance of the saturable inductor is rapidly dropping. Viewed another way, the average voltage across the saturable inductor during the time period t=0 to t=t1 is approximately 350 volts and the saturable inductor supports this voltage for a time period of approximately 100 nanoseconds, after which it saturates. Thus, the volt-second capability of the saturable inductor is approximately 35 volt-microseconds. Between t=t1 and t=t2 the energy transfer cycle takes place. However, shortly prior to t=t2, at about the time labeled t=ta in the figure, the current in the switch and saturable inductor have declined to a point where the inductance of the saturable inductor has started to increase. This increase in inductance has two effects: (a) negative voltage rises across the saturable inductor in response to the rate-of-change of current and (b) the increase in inductance raises the characteristic time constant of the converter, thereby slowing the rate at which the current approaches zero and slightly delaying the point of zero-crossing and switch turn-off. After t=t2 the switch is off and the saturable inductor supports the negative voltage, Vsat(t), and carries a small negative current for a short period of time. The diode (450, FIGS. 17 and 18) across the switch is poled to carry this current. As the capacitor voltage continues to rise, the current in the saturable inductor drops to zero and the operating cycle runs to completion as earlier described.

Unlike the blocking diode, which may be viewed as having essentially infinite impedance when reverse biased, the saturable inductor has finite impedance when blocking. Therefore, as seen in FIGS. 19 and 20, some negative current will flow in the device during the period when it is supporting negative voltage and for short period thereafter. Since practical switching elements cannot generally carry this current, a diode (450, FIGS. 17 and 18) is placed in parallel with the switch, poled and rated so that the diode can support the peak positive voltage across the switch and carry the small negative current associated with the blocking state of the saturable inductor. Since the current in the diode is small, and flows for a brief period of time, the effects on converter efficiency are negligible. Practical configurations of switching elements and diodes, for use in a converter according to the present invention, are illustrated in FIGS. 23A and 23B. In FIG. 23A the switching element 460 is a Field Effect Transistor (FET), whereas in FIG. 23B the switching element 461 is an IGBT.

In general, the use of a saturable inductor as a negative voltage blocking element is of practical importance primarily in zero-current switching boost converters which utilize coupled inductors because the peak negative voltages which must be blocked by such a device can be made relatively small in such converters. This allows use of a saturable inductor which has a modest volt-second capability and which can be constructed to be relatively small and exhibit relatively low resistance. Such a saturable inductor has minimal effect in terms of delaying onset of the energy transfer cycle, will not exhibit losses equivalent to reverse recovery losses in a blocking diode, and can be arranged to dissipate less power than would otherwise be dissipated by a blocking diode. In comparison, the higher peak negative voltages which occur in prior art converters of the kind shown in FIGS. 1 and 2 would, in general, require use of a saturable inductor having a relatively much higher volt-second capability. Such a saturable inductor would be larger, more dissipative and would have a greater effect on overall circuit performance (e.g. in delaying the onset of the energy transfer cycle).

Figure 25A:
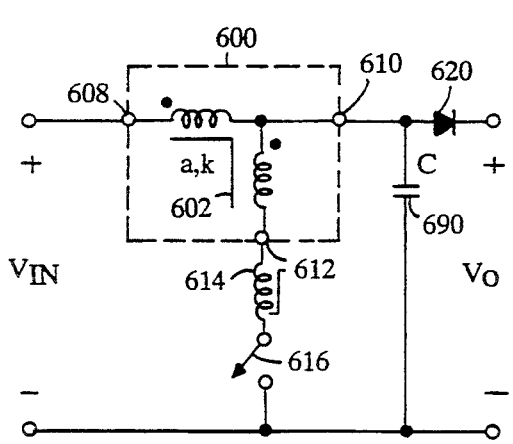
Figure 25B:
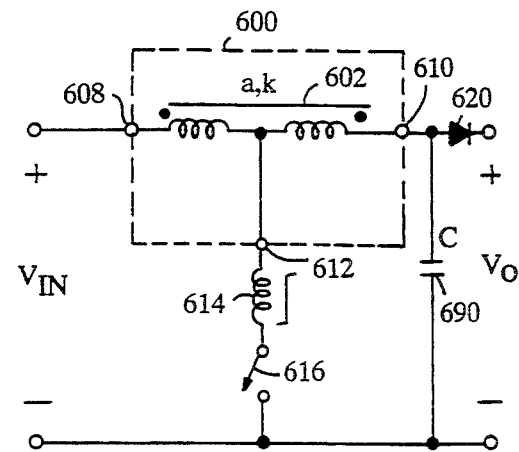
Figure 25C:
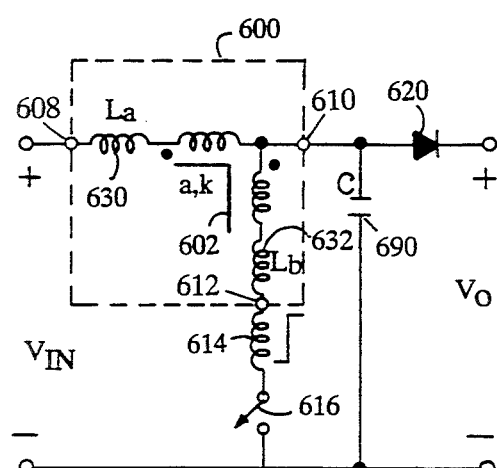
Figure 25D:
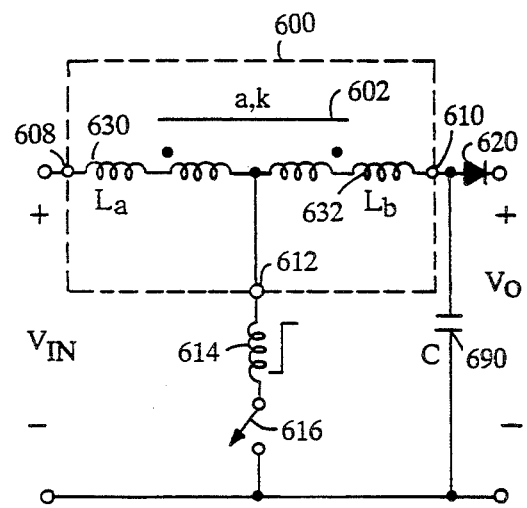
Figure 25E:
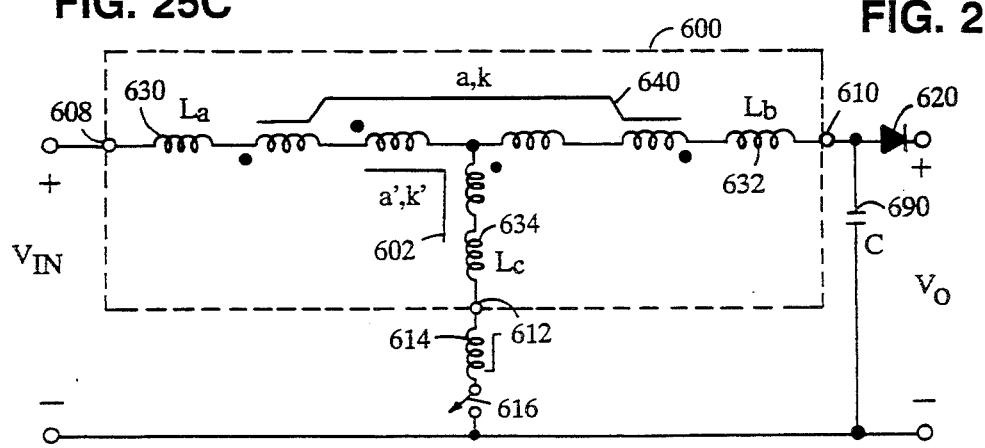

The principles embodied in the present invention may be applied to any boost power converter which includes a coupled inductor (e.g. of the kind shown in FIG. 3) since the peak negative voltages under consideration may be controlled in any such converter to be at relatively low levels. Thus, in general, and with reference to FIG. 24, a zero-current switching boost converter according to the present invention 490 would consist of a magnetic circuit 500 which includes at least one coupled inductor 506; a saturable inductor 514; a switch 502 connected to form a series circuit consisting of the switch, the input voltage source 520, the saturable inductor 514 and at least a first winding 522 of the coupled inductor; and a first capacitor 504 connected to form a series circuit consisting of the first capacitor, the switch, the saturable inductor and at least a second winding 524 of the coupled inductor, the capacitor cooperating with the magnetic circuit 500 and the saturable inductor 514 to define a characteristic time constant for the time variation of the sinusoidal component of the switch current, $I_{sw}(t)$, which flows after the switch is closed. As mentioned earlier, the converter 490 would also include a switch controller 530 for turning the switch 502 on and off at times when the current in the switch is substantially zero, the turn on times being controlled to regulate the ratio of the voltage across the load to the value of voltage delivered by the input source, and would also include a first unidirectional conducting device 532 connected between the magnetic circuit 500 and the load 540, the unidirectional conducting device 532 being poled to permit current, $I_o(t)$, to flow in the direction of the load. Some examples of converters according to the present invention are shown in FIGS. 25A through 25E. In the Figure, the various magnetic circuits include an input port 608, an output port 610 and a shunt port 612, the input source (indicated by the input voltage Vin) being connected between the input port and one end of the switch 616, the saturable inductor 614 being connected between the other end of the switch and the shunt port, the capacitor 690 being connected between the output port and the junction of the input source and the switch, and the first unidirectional conducting device 620 being connected between the output port and the load (indicated by the converter output voltage, Vo). In general, the coupled inductors (e.g. 602, 640 in FIGS. 25A through 25E) will be characterized by coupling coefficients, k1 and k2; turns ratio $N1/N2 = a$; first and second values of leakage inductances, L11 and L12; and magnetizing inductance, Lm, as discussed above, and shown in FIG. 4. The leakage inductances may be set to values which represent the total amount of uncoupled primary and secondary leakage inductance required in a particular application, or the leakage inductances may be augmented by means of discrete inductors placed in series with one or more of the coupled inductor windings (e.g. inductors 630, 632 in FIGS. 25 and 25D; inductors 630, 632, 634 in FIG. 25E). The converter may include more than one coupled inductor, as well as discrete inductors, as shown in FIG. 25E.

In illustration of the reduction in losses which can be achieved in a converter according to the present invention, a converter using component values shown in FIG. 26 was constructed. The converter includes both an input unidirectional conducting device 112 and a forward unidirectional conducting device 212; a capacitor 90 of value 0.025 microfarad; a coupled inductor (shown as the circuit model 202) having a primary to secondary turns ratio $N1/N2 = a = 2$, and primary and secondary leakage inductances, $L11 = 0.95$ microhenry and $L12 = 4$ microhenries, respectively, and winding resistances, R1 and R2, of values indicated in the Figure; a discrete external inductor 632, of value $Lb = 6$ microhenries, in series with the IGBT switch 126 and the secondary winding; and a saturable inductor 428 in series with both the switch and the discrete inductor Lb. The switch is turned on and off at zero current by the switch controller 20. The saturable inductor 428 was constructed by winding 18 turns of $3 \times 18 \times 40$ Litz wire over a toroidal core made of Philips 3R1 material, the core having an outside diameter of 9.7 mm and a height of 3.7 mm. The inductance of the saturable inductor was 11 microhenries at zero bias (i.e. at zero current in the inductor), dropping to 2 microhenries at 1 Ampere, and further dropping to less than 0.5 microhenries at currents above 5 Amperes. The DC resistance of the saturable inductor was $Rs = 22$ milliohms, and, owing to the use of Litz wire for the winding, the resistance did not show any significant increase (due to skin effect) at a frequency of 200 KHz. These values can be seen to result in a converter which is essentially equivalent to the converter of FIG. 18. The losses in the saturable inductor in the circuit of FIG. 26 may be compared to the losses in a blocking diode in a converter which includes such a device (e.g. the circuit in FIG. 11) by assuming that the forward voltage drop in the blocking diode is an essentially constant Vd=1 volt during forward conduction (which closely approximates the behavior of such a device, a Motorola MUR840 ultrafast rectifier, for example). The losses in the saturable inductor will be proportional to the square of the rms current in the inductor, whereas the forward losses in the ultrafast blocking diode (neglecting reverse recovery losses, for the moment), are, as indicated earlier, proportional to the average current in the diode. For the circuit of FIG. 11 (with N1/N2=2, Vin=150 Volts and all other circuit values as shown in the Figure) delivering an average current of Ioavg=1.52 Amperes to a load at Vo=350 Volts (532 Watts delivered), the average current in the blocking diode will be Iswavg=2.16 Amperes and the average input current will be Iinavg=3.68 Amperes. The forward conduction loss in the diode will be Vd*Iswavg=2.16 Watts. For the converter of FIG. 26, with the same input voltage, output voltage, load power and turns ratio, the respective average currents will be the same, and the rms current in the switch will be approximately Iswrms=4.5 Amperes. The loss in the saturable inductor will be Rs*Iswrms$^2$=0.44 Watts, significantly less than the forward losses in the blocking diode alone. When reverse recovery effects are accounted for the reduction in losses is even more significant.

With reference to FIG. 27A the saturable inductor may be viewed as a device which exhibits a relatively high value of inductance when the current in the device is below a first saturation value, Is1, and which exhibits a sharp drop in inductance as the current rises above Is1. For values of current below Is1 the device exhibits a blocking inductance which is of a value greater than Lb1; for values of current above a second saturation value, Is2, (which might, for example, be twice the value of Is1) the saturable inductor exhibits a residual inductance which is of a value less than Lr. For illustrative purposes we may consider Llb and Lr to be essentially constant within the ranges of current shown in the Figure. From this viewpoint, the saturable inductor may be considered to be a series combination (FIG. 27B) of a discrete inductor of value Lr and an "ideal saturable inductor" whose inductance value varies between zero (at currents above Is2) and [Lb1-Lr] (at currents below Is1). It is to be noted that the value, Lr, of the discrete inductor acts in concert with the magnetic elements in the magnetic circuit (500 FIG. 24) in setting the overall equivalent inductance, Leq, of the converter, and hence contributes in determining the value of the characteristic time constant of the converter. In performing its function, the volt-second rating of the saturable inductor is of importance. If we assume that the current in the saturable inductor is initially zero and a voltage, V(t), is impressed across the device, then the current in the device will be:

$$I(t) = 1/Lb1 \int_0^t (V(t)*dt) = VS(t)/Lb1 \quad (2)$$

where VS(t) is defined as the "volt-seconds" impressed across the saturable inductor. So long as I(t) does not exceed Is1 (i.e. VS(t) is below a value VSr=Is1,Lb1) the device will remain unsaturated and its inductance will remain at Lb1 (i.e. it will be in its blocking state). However, if VS(t) exceeds VSr, then the inductance will decline and the device will saturate. VSr is defined as the volt-second rating of the device.

The values which characterize the saturable inductor (i.e. Llb, Lr, Is1, Is2) are selected so that the benefits of the half-cycle mode of operation may be achieved in the converter of which it forms a part. One of these benefits is the ability of two or more such converters to predictably share in the power delivered to a load when the converters are operated in synchronism—a direct result of the strong dependence between converter operating frequency and converter loading in the half-cycle mode of operation. If the inductance of the saturable inductor in the blocking state (i.e. Llb) is too low the amount of negative current which will flow in the device after turning off the switch will be overly large and the behavior of the converter will approach the behavior of a converter operating in a long-cycle mode. Increased negative current flow will also result in increased dissipation in the diode which is across the switch (e.g. diode 450, FIGS. 23 and 26) and a reduction in converter efficiency. The volt-second capability of the device is also of importance. While the volt-second rating must be great enough to support the negative voltage which appears at the junction of the magnetic circuit and the saturable inductor during the time period between switch turn-off and the time at which the voltage passes through zero and becomes positive, too large a volt-second rating will result in excessive delays between switch turn-on and inception of the energy transfer cycle (e.g. the time between switch closure and t=t1 in FIG. 19A).

Although the design of the saturable inductor in any given application will depend on the specific arrangement of the converter of which it forms a part (e.g. input voltage range, output voltage range, power rating, load variation, magnetic circuit configuration) acceptable converter behavior can usually be achieved if:

(a) Lb1 is set so that the peak current which flows in the device during the blocking state is less than 20% of the peak forward current excursion, Ip (FIG. 5), which occurs during the energy transfer cycle. Ip may be approximated as Ip=Vo*sqrt(C/Leq) where Leq is the equivalent inductance (which include the effects of the magnetic elements in the magnetic circuit and the effect of the residual inductance, Lr, of the saturable inductor) which, in cooperation with the capacitor, serves to set the characteristic time constant of the converter.

(b) the volt-second rating (i.e. Is1*Lb1) of the saturable inductor is chosen to be no greater than about 50% above the rating required to support the negative voltage which appears at the junction of the magnetic circuit and the saturable inductor after the switch is turned off.

In any particular application, it will generally be desired to maintain the output voltage of a zero-current switching boost converter at some predetermined value, Vo, as both the input source voltage and the converter load vary. The value of Vo may either be fixed, or it may be varied in some predetermined way (see Vinciarelli, U.S. patent application Ser. No. 07/642,232, filed Jan. 16, 1991). One method of controlling the zero-current switching boost converter output voltage is shown in FIG. 28. In the Figure a zero-current switching boost converter 942, which may be of the kinds shown in FIGS. 1, 2, 3, 7, 9, 10, 11, 17, 18, 24, 25 or 26, receives power from an input voltage source, at a voltage Vin, and delivers power to a load 947 at an output voltage Vo, where Vo>Vin. A first signal, Vref, indicative of some desired value of output voltage Vo, is supplied to an error amplifier 944 which also receives a second signal, V1=K·Vo, which is proportional to the converter output voltage, Vo. The signal V1 is delivered to the error amplifier by a divider 946. If the signal V1 is greater than Vref, the output of the error amplifier will decrease; if the signal V1 is less than Vref, the output of the error amplifier will increase. The output of the error amplifier is delivered to a variable frequency controller 948. As the error amplifier output increases, the signal, Vf, delivered to the switch controller 20, will increase the rate at which converter operating cycles are initiated (i.e., increase the converter operating frequency). In this way, the converter operating frequency will automatically be adjusted so as to maintain Vo=Vref/K as both the load and input voltage vary.

There are many ways of implementing the switch controller (e.g. element 20 FIGS. 1, 2, 26, 28). Details of one such controller are illustrated in FIG. 29, which shows a portion of a zero-current switching boost converter consisting of a switch controller 20, a switch 130 and a current transformer 800 connected in series with the switch 130. As shown in the Figure, the signal INIT goes high at time t=0, causing the output, VQ, of the set-reset flip-flop 870 (the output of which, VQ, goes high when a high signal is applied to its S input and goes low when a high signal is applied to its R input) to go to its high state. The signal VQ is delivered to a switch driver 810 which closes the switch 40 when VQ is high. Upon closure, switch current, Isw, begins to flow, and, by transformer action, a fraction of this current flows in the signal diode 830 connected to the secondary of the current transformer 800 (the turns ratio, N2/N1, being greater than one). The diode voltage, VI, is delivered to one input of the comparator 840. A threshold voltage, Vt (for example, 0.1 V), is delivered to the other input of the comparator 840. As VI rises above Vt the comparator output goes to its low state. As the switch current, Isw, returns to zero, at time t2, the current in the diode also decreases and the voltage VI drops below Vt. This causes the output of the comparator 840 to return to its high state and, via the capacitor 850 and the resistor 860, causes a high going pulse, VR, to be delivered to the R input of the flip-flop 870. This pulse resets the flip-flop, VQ goes low and the switch 40 is turned off. As described, the switch controller 41 of FIG. 33 is arranged so that it opens the switch at essentially the first instant in time, following the time when the switch is turned on, when the current returns to zero. The arrangement of FIG. 3 is thus suitable for the

What is claimed is:

1. A boost power converter apparatus for transferring power from an input voltage source to a voltage-sinking load at a load voltage of magnitude greater than the magnitude of the voltage of said input voltage source, comprising
   a magnetic circuit comprising at least one coupled inductor,
   a saturable inductor,
   a switch connected to form a series circuit comprising said switch, said input voltage source, said saturable inductor, and at least a first winding of said coupled inductor,
   a first capacitor connected to form a series circuit comprising said first capacitor, said switch, said saturable inductor, and at least a second winding of said coupled inductor, said capacitor cooperating with said magnetic circuit and said saturable inductor to define a characteristic time constant for the time variation of the sinusoidal component of the switch current which flows after said switch is closed,
   a first unidirectional conducting device connected between said magnetic circuit and said load, said unidirectional conducting device being poled to permit current to flow in the direction of said load,
   said magnetic circuit comprising an input port, an output port, and a shunt port, said input source being connected between said input port and one end of said switch, said saturable inductor being connected between the other end of said switch and said shunt port, said first capacitor being connected between said output port and said junction of said input source and said switch, and said first unidirectional conducting device being connected to said output port.

2. The apparatus of claim 1 further comprising a switch controller for turning said switch on and off at times when the current in said switch is substantially zero, said turn on times being controlled to regulate the ratio of the voltage across said load to the average value of voltage across said input source, said ratio being greater than or equal to one.

3. The apparatus of claim 1 wherein said magnetic circuit comprises a coupled inductor having a first winding and a second winding, said first winding being connected between said input port and said shunt port, said second winding being connected between said shunt port and said output port, the polarity of said windings being arranged so that imposition of a positive voltage between said input port and said shunt port induces a positive voltage to appear between said output port and said shunt port.

4. The apparatus of claim 1 wherein said magnetic circuit comprises a coupled inductor having a first winding and a second winding, said first winding being connected between said input port and said output port, said second winding being connected between said shunt port and said output port, the polarity of said windings being arranged so that imposition of a positive voltage between said input port and said output port induces a positive voltage to appear between said output port and said shunt port.

5. The apparatus of claim 3 or 4 wherein said magnetic circuit further comprises a discrete inductor connected in series with said first winding.

6. The apparatus of claim 3 or 4 wherein said magnetic circuit further comprises a discrete inductor connected in series with said second winding.

7. The apparatus of claim 4 wherein said magnetic circuit further comprises a second coupled inductor having a third winding and a fourth winding, said third winding connected to said input port and in series with said first winding and said fourth winding connected between the junction of said first and second windings and said output port.

8. The apparatus of claim 7 wherein said magnetic circuit further comprises a discrete inductor connected in series with said third winding.

9. The apparatus of claim 7 wherein said magnetic circuit further comprises a discrete inductor connected in series with said fourth winding.

10. The apparatus of claim 7 wherein said magnetic circuit further comprises a discrete inductor connected in series with said second winding.

11. A boost power converter apparatus for transferring power from an input voltage source to a voltage-sinking load at a load voltage of magnitude greater than the magnitude of the voltage of said input voltage source, comprising a switch, a saturable inductor, a coupled inductor comprising a first winding, having N1 turns, connected to and in series with a second winding, having N2 turns, the polarities of said first and said second windings being arranged so that a voltage across said first winding will induce a voltage across said second winding which adds to said voltage across said first winding, said first winding being connected to said input source, both of said windings of said coupled inductor being connected in series with said input source, said saturable inductor and said switch, said coupled inductor being characterized by a turns ratio, $a=N1/N2$; a total first winding inductance, Lpri; a total second winding inductance, Lsec; first and second winding leakage inductances, L11 and L12, respectively; and a magnetizing inductance, Lm, where $Lpri=Lm+L11$ and $Lsec=L12+Lm/a^2$, a first capacitor, of value C, connected between the junction of said first winding and said second winding and the junction of said input source and said switch, a first unidirectional conducting device connected between said load and the junction of said first winding and said second winding, said unidirectional conducting device being poled to conduct current from said input source to said load after said switch is opened, a switch controller for turning said switch on and off at times when the current in said switch is substantially zero, said coupled inductor, said saturable inductor and said first capacitor defining a characteristic time scale for the time variation of the sinusoidal component of the switch current which flows after turning said switch on, the ratio of the voltage across said load to the average value of voltage across said input source being varied by varying the rate at which said turn on times are initiated, said ratio being greater than or equal to one.

12. A boost power converter apparatus for transferring power from an input voltage source to a voltage-sinking load at a load voltage of magnitude greater than the magnitude of the voltage of said input voltage source, comprising a first capacitor, of value C, a coupled inductor comprising a first winding, having N1 turns, connected to and in series with a second winding, having N2 turns, the polarities of said first and said second windings being arranged so that a voltage across said first winding will induce a voltage across said second winding which is in opposition to said voltage across said first winding, said first winding being connected to said input source, both of said windings of said coupled inductor being connected in series with said input source and said first capacitor, said coupled inductor being characterized by a turns ratio, $a=N1/N2$; a total first winding inductance, Lpri; a total second winding inductance, Lsec; first and second winding leakage inductances, L11 and L12, respectively; and a magnetizing inductance, Lm, where $Lpri=Lm+L11$ and $Lsec=L12+Lm/a^2$, a saturable inductor, one end of which is connected to the junction of said first winding and said second winding, a switch connected between the other end of said saturable inductor and the junction of said input source and said first capacitor, a first unidirectional conducting device connected between said load and the junction of said second winding and said first capacitor, said unidirectional conducting device being poled to conduct current from said input source to said load after said switch is opened, a switch controller for turning said switch on and off at times when the current in said switch is substantially zero, said coupled inductor, said saturable inductor and said first capacitor defining a characteristic time scale for the time variation of the sinusoidal component of the switch current which flows after turning said switch on, the ratio of the voltage across said load to the average value of voltage across said input source being varied by varying the rate at which said turn on times are initiated, said ratio being greater than or equal to one.

13. The boost power converter apparatus of anyone of claims 1 through 4 or 7 through 12 further comprising a second unidirectional conducting device connected in series between said input source and said boost power converter apparatus.

14. The boost power converter apparatus of any one claims 1 through 4 or 7 through 12 wherein said input source is an AC source and further comprising a second unidirectional conducting device comprising a full-wave rectifier connected between said AC source and said boost power converter apparatus.

15. The apparatus of claim 13 further comprising a third unidirectional conducting device connected between the input of said boost power converter and said load, said third unidirectional conducting device being poled so that current flowing back toward said input source which is blocked by said second unidirectional conducting device can flow through said third unidirectional conducting device in the direction of said load.

16. The apparatus of claim 14 further comprising a third unidirectional conducting device connected between the input of said boost power converter and said load, said third unidirectional conducting device being poled so that current which flows back from the input of said boost power converter in the direction of said input source, and which is inhibited from flowing back into said input source by said second unidirectional conducting device, can flow through said third unidirectional conducting device in the direction of said load.

17. The apparatus of anyone of claims 2 through 4 or 7 through 12 wherein said controller is arranged to turn said switch off at essentially the first instant in time, following the time when said switch is turned on, when the current in said switch returns to zero.

18. The apparatus of anyone of claims 1 through 4 or 7 through 12 further comprising an output capacitor in parallel with said load, the capacitance of said output capacitor being large enough so that it smooths the effect of time variations in the output current delivered to said load so that the output voltage of the converter is an essentially DC value.

19. The apparatus of anyone of claims 1 through 4 or 7 through 12 further comprising an output voltage controller which varies the frequency of the switch turn-on times in response to the output voltage at the load.

20. The apparatus of claim 14 further comprising an output voltage controller which varies the frequency of the switch turn-on times in response to the output voltage at the load.

21. The apparatus of claim 1, 11 or 12 wherein said switch comprises a unipolar switch capable of withstanding a unipolar voltage when turned off, the polarity of said unipolar voltage defining positive and negative poles on said switch, and capable of carrying a unipolar current, when turned on, between said positive and negative poles, and a unidirectional conducting device connected in parallel with said unipolar switch, said unidirectional conducting device being poled so that it conducts current in the direction opposite to the direction of conduction of said unipolar switch.

22. The apparatus of claim 21 wherein said unipolar switch comprises a field effect transistor.

23. The apparatus of claim 21 wherein said unipolar switch comprises an insulated gate bipolar transistor.

* * * * *

UNITED STATES PATENT AND TRADEMARK OFFICE
CERTIFICATE OF CORRECTION

PATENT NO.   : 5,432,431

DATED        : July 11, 1995

INVENTOR(S)  : Patrizio Vinciarelli and Charles S. Skoolicas

It is certified that error appears in the above-identified patent and that said Letters Patent is hereby corrected as shown below:

Col. 15, line 68, "VSr=Is1,Lb1)" should be --Vsr=$I_s$1(Lb1)--.

Col. 17, line 55, "FIG3" should be --FIG.33--.

Col. 20, lines 32, 37, 62, 67, "anyone" should be --any one--.

Col. 20, line 38, insert --of-- before "claims".

Col. 21, line 6, "anyone" should be --any one--.

Signed and Sealed this

Fifth Day of August, 1997

Attest:

Attesting Officer

BRUCE LEHMAN

Commissioner of Patents and Trademarks